United States Patent
Boiman et al.

(10) Patent No.: US 8,363,959 B2
(45) Date of Patent: Jan. 29, 2013

(54) DETECTING IRREGULARITIES

(75) Inventors: Oren Boiman, Tel-Aviv (IL); Michal Irani, Rehovot (IL)

(73) Assignee: Yeda Research & Development Co. Ltd., Rehovot (IL)

(*) Notice: Subject to any disclaimer, the term of this patent is extended or adjusted under 35 U.S.C. 154(b) by 1145 days.

(21) Appl. No.: 11/909,169

(22) PCT Filed: Mar. 21, 2006

(86) PCT No.: PCT/IL2006/000359
§ 371 (c)(1),
(2), (4) Date: Feb. 12, 2008

(87) PCT Pub. No.: WO2006/100674
PCT Pub. Date: Sep. 28, 2006

(65) Prior Publication Data
US 2008/0208828 A1      Aug. 28, 2008

Related U.S. Application Data

(60) Provisional application No. 60/663,249, filed on Mar. 21, 2005, provisional application No. 60/751,290, filed on Dec. 19, 2005.

(51) Int. Cl.
G06K 9/00       (2006.01)
G06K 9/68       (2006.01)

(52) U.S. Cl. ........................................ 382/220; 382/181

(58) Field of Classification Search .......... 382/115–124, 382/165, 181, 220, 305
See application file for complete search history.

(56) References Cited

U.S. PATENT DOCUMENTS

| | | | | |
|---|---|---|---|---|
| 5,220,441 A * | 6/1993 | Gerstenberger | | 358/487 |
| 5,485,212 A * | 1/1996 | Frederick | | 375/240.12 |
| 6,222,939 B1 * | 4/2001 | Wiskott et al. | | 382/209 |
| 6,282,317 B1 | 8/2001 | Luo et al. | | |
| 6,539,055 B1 * | 3/2003 | Hazra | | 375/240.16 |
| 6,751,363 B1 * | 6/2004 | Natsev et al. | | 382/305 |
| 2001/0048758 A1 * | 12/2001 | Oosawa | | 382/132 |
| 2002/0122573 A1 * | 9/2002 | Eraslan | | 382/118 |
| 2002/0131641 A1 * | 9/2002 | Luo et al. | | 382/218 |
| 2003/0035573 A1 * | 2/2003 | Duta et al. | | 382/128 |
| 2003/0086616 A1 * | 5/2003 | Oh et al. | | 382/209 |
| 2004/0066966 A1 * | 4/2004 | Schneiderman | | 382/159 |
| 2004/0208374 A1 * | 10/2004 | Lee et al. | | 382/209 |
| 2005/0108745 A1 * | 5/2005 | Linzer | | 725/19 |
| 2006/0023934 A1 * | 2/2006 | Wakabayashi | | 382/147 |

OTHER PUBLICATIONS

Kobayashi et al. ("Action and simultaneous multiple-person identification using cubic higher-order local auto-correlation," IEEE 17th Int'l Conf. on Pattern Recognition, 2004).*

(Continued)

Primary Examiner — Yubin Hung
(74) Attorney, Agent, or Firm — Eitan, Mehulal & Sadot

(57) ABSTRACT

Method and apparatus for inferring irregularities in query data relative to referential data includes attempting to compose the query data, like a puzzle, from large chunks of the referential data, and inferring irregularities in the query data based on at least the size of the matching chunks. The larger the size of a matching chunk, the more likely it is that its corresponding region in the query data is valid and not irregular. Regions in the query data which cannot be composed from the referential data, or can only be composed using small fragmented pieces and not large chunks of the referential data, are considered irregular. The method and apparatus is applicable to all types of signals, including images, video data, medical data, one-dimensional signals and multi-dimensional signals, and can be used to identify, inter alia, suspicious behaviors, suspicious objects, irregular patterns and defects in goods.

96 Claims, 16 Drawing Sheets

OTHER PUBLICATIONS

Owens et al. ("Application of self-organising map to trajectory classification," Proceedings. Third IEEE Int'l Workshop on Visual Surveillance, Jul. 1, 2000).*

Jojic et al: Epitomic analysis of appearance and shape. In Proc. of ICCV 2003. http://www.research.microsoft.com/~jojic.

Ivanov et al., "Recognition of multi-agent interaction in video surveillance", ICCV, 1999.

Stauffer et al.,"Learning patterns of activity using real-time tracking", PAMI, 2000.

Zhong et al.,"Detecting unusual activity in video", CVPR04.

Itti et al.,"A model of saliency-based visual attention for rapid scene analysis", PAMI, 1998.

Efros et al. "Texture synthesis by non-parametric sampling", *ICCV*, 1999.

Freeman et al. "Learning low-level vision", *IJCV*, 2000.

Wexler et al. "Space-time video completion", *CVPR04*, 2004.

Bart et al. "Class-based matching of object parts", *VideoRegister04*, 2004.

Fergus et al. "Object class recognition by unsupervised scale-invariant learning", *CVPR03*, 2003.

Felzenszwalb et al. "Pictorial structures for object recognition", *IJCV*, 2005.

Leibe et al. "Combined object categorization and segmentation with an implicit shape model", *ECCV04*, 2004.

Sivic et al. "Video google: A text retrieval approach to object matching in videos", *ICCV*, 2003.

* cited by examiner

US 8,363,959 B2

DETECTING IRREGULARITIES

CROSS-REFERENCE TO RELATED APPLICATIONS

This application is a U.S. National Phase Application under 35 U.S.C. 371 of PCT International Application No. PCT/IL2006/000359, which has an international filing date of Mar. 21, 2006, and which claims priority from U.S. Provisional Patent Application No. 60/663,249, filed Mar. 21, 2005, and from U.S. Provisional Patent Application No. 60/751,290, filed Dec. 19, 2005, all of which are incorporated herein by reference in their entirety.

FIELD OF THE INVENTION

The present invention relates to detecting irregularities in various types of signal data in general and with respect to referential data in particular.

BACKGROUND OF THE INVENTION

The detection of irregularities in data, e.g., visual data, such as images and video sequences, has many practical applications. The detection of suspicious behaviors or unusual objects, for example, is important for surveillance and monitoring. Identifying spatial saliency in images is useful for quality control and automatic visual inspection. Detecting behavioral saliency in video is useful for drawing the attention of a viewer to particular areas of interest in the video.

One of the main problems in automating the detection of irregularities is that the notion of "irregular" or "suspicious" is dependent upon a context-based definition of "regular" or "valid". For example, in a library where fifty people are reading or browsing for books quietly, the behavior of one man cheering wildly is "irregular". However, in the context of a football stadium, and hundreds of wildly cheering fans, it is the behavior of a person reading quietly in the stands which is irregular.

Thus, while a casual human observer would effortlessly draw the conclusions described hereinabove regarding the regularity of reading or cheering in two different situations, a serious impediment to performing the detection of irregularities in data by automatic means lies in the impossibility of explicitly defining all possible valid configurations for a given context. Attempts to overcome this impediment in the prior art have included a variety of approaches for the various applications of irregularity detection in images and video sequences.

Previous approaches to recognition of suspicious behaviors or activities by automatic means can broadly be classified into two classes of approaches: rule-based methods (as taught by Ivanov et al., "Recognition of multi-agent interaction in video surveillance", ICCV, 1999) and statistical methods without predefined rules (as taught by Stauffer et al., "Leaning patterns of activity using real-time tracking", PAMI, 2000 and Zhong et al., "Detecting unusual activity in video", CVPR04). The statistical methods may be considered preferable since they do not assume a predefined set of rules for all valid configurations. Instead, they try to automatically learn the notion of regularity from the data, and thus infer what is suspicious. Nevertheless, the representations employed in previous methods have been either very restrictive (e.g., trajectories of moving objects in Stauffer et al.), or else too global (e.g., a single small descriptor vector for an entire frame in Zhong et al.).

Previous approaches for detecting image saliency (e.g., as taught by Itti et al., "A model of saliency-based visual attention for rapid scene analysis", PAMI, 1998) proposed measuring the degree of dissimilarity between an image location and its immediate surrounding region. Thus, for example, image regions which exhibit large changes in contrast are detected as salient image regions. The definition of "visual attention" is derived from the same reasoning. However, the notion of saliency cannot be necessarily determined by the immediate surrounding image regions. For example, a single yellow spot on a black paper may be salient. However, if there are many yellow spots spread all over the black paper, then a single spot will no longer draw our attention, even though it still induces a large change in contrast relative to its surrounding vicinity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 is an illustration of the process, performed by the irregularity detector of FIG. 1, of comparing two ensembles of patches, in order to determine the extent to which they are similar;

Figure 1:
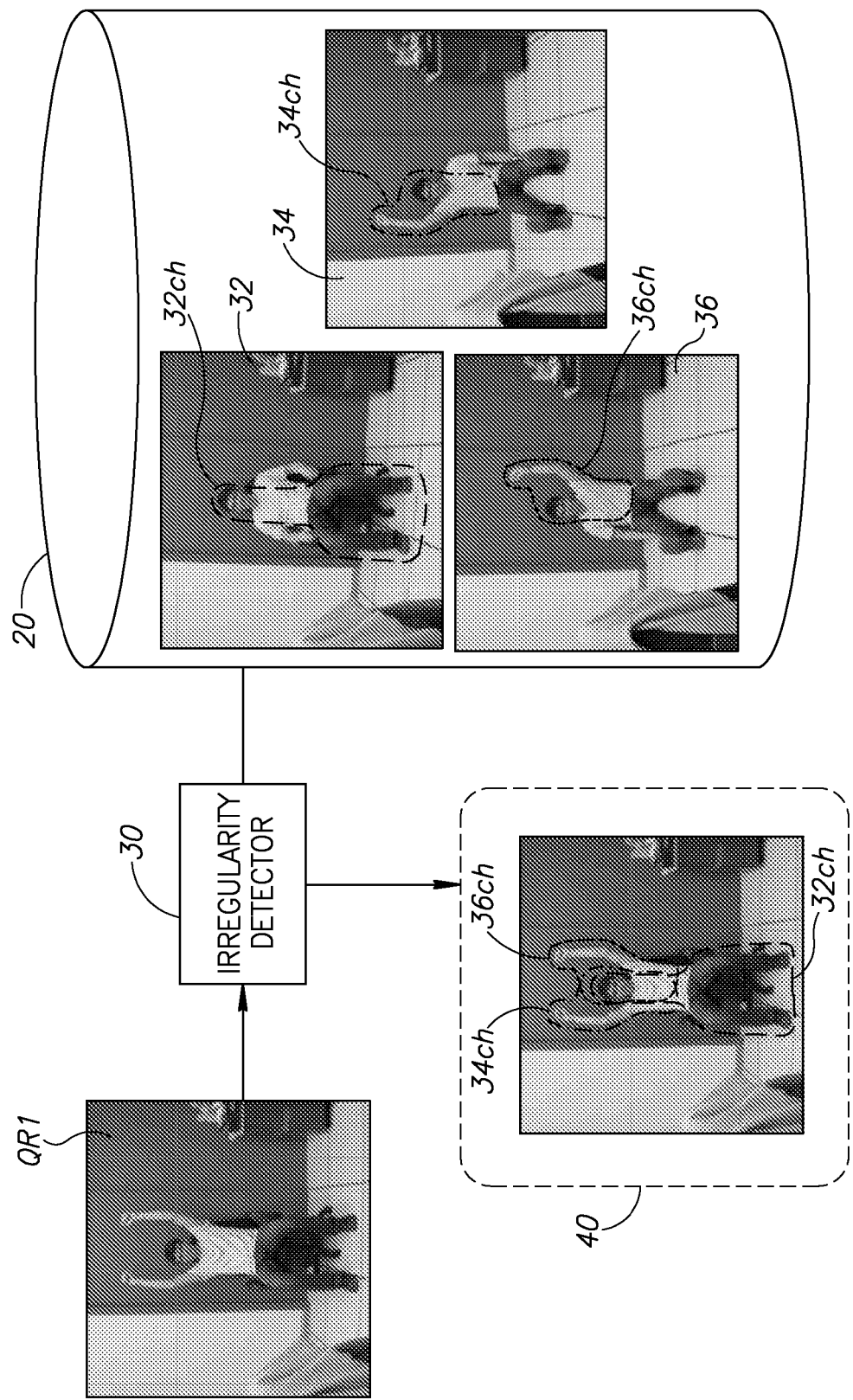
FIG. 1 is an illustration of an irregularity detector, constructed and operative in accordance with a preferred embodiment of the present invention, performing irregularity detection on an exemplary query image in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that a casual human observer of the two scenes described in the Background (i.e., a library scene where one man cheers wildly while everyone else reads or browses quietly, and a football stadium scene where one man reads quietly in the stands among hundreds of cheering fans) would not need to have had the particularities of these two situations described or explained to him prior to seeing them, in order to draw the conclusions given in the Background about which behavior was irregular in which scene.

This is because, given only a few examples, humans have a notion of what is regular/valid, and what is irregular/suspicious, even when faced with new, previously unseen configurations. Explicit definition of all possible valid configurations for a given context is not necessary. The notion of "regularity"/"validity" is learned and generalized from just a few examples of valid patterns (of behavior in video, or of appearance in images), and all other configurations are automatically inferred from those.

Applicants have realized that the human ability to learn and generalize from just a few examples of valid patterns, and thereafter to automatically infer all other valid configurations, may be substantially replicated by automated means using an approach based on emulating the process of assembling a puzzle.

In this approach, provided by the present invention, examples of valid images exist in a database. Given a new, unknown image (a query), a search may be conducted in the database for large chunks of data which match portions of the query. The search may proceed until an image substantially identical to the query image is composed. This may occur when all of the pieces of the puzzle, i.e. the chunks of data resulting from the database search, are assembled.

This process is illustrated in FIG. 1, reference to which is now made. In the example shown in FIG. 1, an exemplary database 20 contains images 32, 34 and 36 in which a man is shown sitting in various positions. In image 32, the man is sitting in a chair with his arms resting on the armrests of the chair. In image 34, the man is sitting on the floor, with his legs stretched out in front of him and his right arm extended upwards. The position of the man in image 36 is the same as his position in image 34, except that his left arm is extended upwards instead of his right arm.

In query QR1, the man seen in database images 32, 34 and 36 is shown sitting, as in image 32, in a chair, with both of his arms extended upwards. In accordance with a preferred embodiment of the present invention, irregularity detector 30, as shown in FIG. 1, may conduct a search in database 20 for large chunks of data, which when assembled, may compose an image matching query image QR1.

As shown in FIG. 1, exemplary search results 40 for the exemplary search conducted by irregularity detector 30 in database 20 comprise an image which matches query QR1. It may further be seen in FIG. 1 that the matching image to query QR1 shown in search results 40 is comprised of data chunks 32ch, 34ch and 36ch. It may also be seen in FIG. 1 that data chunks 32ch, 34ch and 36ch each comprise the largest chunk of contiguous data in each of database images 32, 34 and 36 respectively which, in its entirety, is also contained in query image QR1. In other words, data chunks 32ch, 34ch and 36ch are the portions of images 32, 34 and 36, respectively, which are also contained in query image QR1.

Specifically, as shown in FIG. 1, data chunk 32ch includes the head, torso and legs of the man in a sitting position in the chair, and excludes the arms of the man resting on the armrests, since in query image QR1, both arms of the man are extended upwards. Data chunk 34ch includes the head, the upraised right arm of the man and most of his torso except the part near his lowered left arm. Data chunk 36h includes the head, the upraised left arm of the man and most of his torso except the part near his lowered right arm. The lower half of the body of the man which is seated on the floor in images 34 and 36 is excluded from both data chunks 34h and 36h, since in query image QR1, the man is sitting on a chair.

In accordance with a preferred embodiment of the present invention, irregularity detector 30 may determine that the position of the man in query QR1 is a "regular" (i.e. "valid") position with respect to database 20, since it succeeded in composing the entire image of the position of the man shown in query QR1 from large data chunks 32ch, 34ch, and 36ch extracted from database 20.

Applicants have realized that the method provided by the present invention described with respect to FIG. 1 may allow the validity of a large context of patterns and behaviors, even configurations which have not been previously seen, to be inferred and generalized from just a few examples. Thus, in the example shown in FIG. 1, the validity of the pose shown in query QR1, in which both arms of the man are raised, may be inferred from the validity of the three database images 32, 34 and 36, even though the particular configuration of the query is not included in the database. The process performed by the present invention may therefore be described as "inference by composition".

Figure 2:
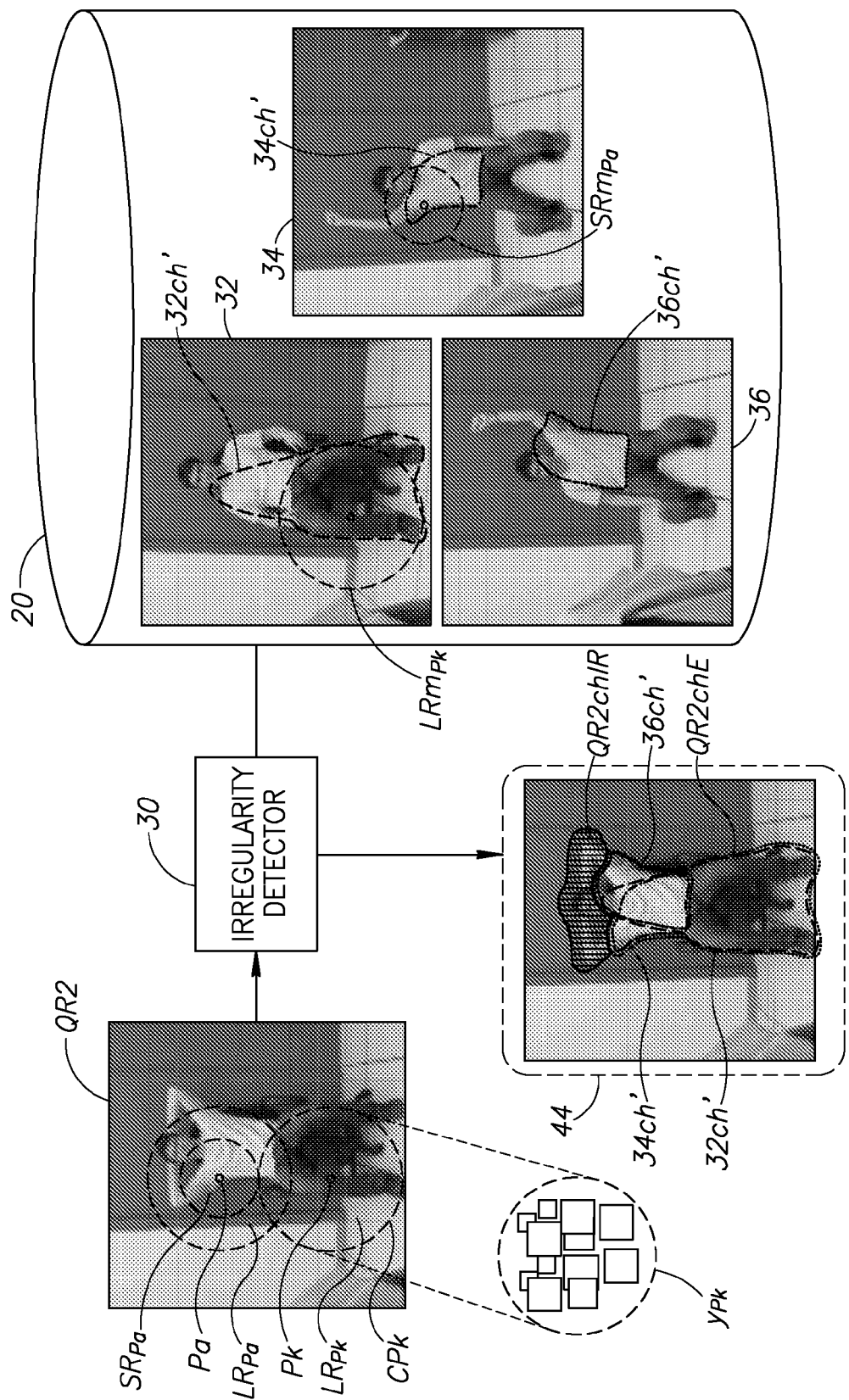
FIG. 2 is an illustration of the irregularity detection process illustrated in FIG. 1, performed on an alternative exemplary query image.

FIG. 2, reference to which is now made, illustrates the inference process performed by irregularity detector 30 on query QR1 in FIG. 1, for a different query, QR2. Database images 32, 34 and 36 in FIG. 2 are identical to database images 32, 34 and 36 of FIG. 1. Query QR2 is similar to query QR1 of FIG. 1 in that it shows the man seen in database images 32, 34 and 36 sitting in a chair. However, unlike the position of the man in query QR1, in which both of his arms are extended upwards, in query QR2, the man holds his hands folded behind his head.

As illustrated in FIG. 2, irregularity detector 30, in accordance with a preferred embodiment of the present invention and in a process similar to that described previously with respect to FIG. 1, may conduct a search in database 20 for large chunks of data which, when assembled, may compose an image matching query image QR2.

Results 44 in FIG. 2 illustrate that irregularity detector 30 found a significant chunk of query image QR2 (the legs, torso, lower portion of the head, and upper arms of the man) in database 20. Specifically, it may be seen in results 44 that this "explained" chunk of query image QR2, chunk QR2chE, is comprised of chunk 32ch' of image 32, chunk 34ch' of image 34, and chunk 36ch' of image 36. It may be seen in FIG. 2 that chunk 32ch' comprises the legs, torso, and lower portion of the head of the man, that chunk 34ch' comprises the torso and right upper arm and that chunk 36ch' comprises the torso and the left upper arm. However, results 44 also show that irregularity detector 30 failed to find chunks of data in database 20 to match the region of query QR2 comprising the upper portion of the head of the man and most of his arms which are in a folded position behind his head.

In accordance with the present invention, irregularity detector 30 may identify regions of a query for which it may fail to find matching data chunks in the database as "irregular". Thus, the region of query QR2 comprising the upper portion of the head of the man and the unmatched portions of his arms, region QR2chIR, is marked as irregular in results 44 by a vertical hatching pattern.

In accordance with one embodiment of the present invention, irregularity detector 30 may process a query, such as query QR1 in FIG. 1 or query QR2 in FIG. 2, one data point at a time. For example, exemplary point Pk in query QR2 may be the first point analyzed by irregularity detector 30. In accordance with the present invention, irregularity detector 30 may then consider a large region LR around point Pk. An exemplary large region LR around point Pk, region $LR_{Pk}$, considered by irregularity detector 30 in the example shown in FIG. 2, is shown in FIG. 2 to surround point Pk and to be encompassed by circle CPk.

In accordance with the present invention, the size of region LR may be 50×50 pixels, or between 5% and 15% of the query image size. It will be appreciated that the size of region LR is significant in the present invention. That is, if region LR is not sufficiently large, the similarity between region LR and its match in database 20 may not be sufficiently meaningful. For example, if an exemplary region LRfew in query QR2 were to comprise only a few pixels, a match for region LRfew in database 20 might be readily found. However, since the few pixels comprising region LRfew would comprise an area too small to contain any meaningful information about query QR2, the demonstration of similarity to an equally small area in the database would also not be meaningful, and no indication of validity with respect to the database would be provided by the match.

By the same token, as the size of region LR increases, its representation of the query of which it is a part becomes more significant, and the significance of finding a match for it in database 20 increases. That is, the larger the size of region LR, the more likely it is that "regularity" or "validity" with respect to database 20 is indicated when a match for it is found in database 20. Similarly, the smaller region LR is, the less likely it is that finding its match in database 20 indicates regularity/validity with respect to database 20.

Thus, in accordance with a preferred embodiment of the present invention, regions in the query which can be composed using large contiguous chunks of data extracted from the database may be considered to be very likely (i.e., likely to indicate regularity or validity), whereas regions in the query data which cannot be composed from the database, or which can be composed, but only by using small fragmented pieces of data from the database, may be regarded as unlikely (i.e. irregular or suspicious).

Returning now to FIG. 2, it may be seen that upon analysis of point Pk, and consequent consideration of region $LR_{Pk}$, irregularity detector 30 finds a match for the entire region $LR_{Pk}$ in image 32 of database 20. The matching region is identified by the notation $LRm_{Pk}$ in FIG. 2. It may further be seen in FIG. 2 that upon analysis of an additional exemplary point, Pa, irregularity detector 30 fails to find a match for region $LR_{Pa}$, a region similar in size and shape to region $LR_{Pk}$ and surrounding point Pa.

In accordance with the present invention, following a failure to find a match for a query region LR, irregularity detector 30 may reduce the size of query region LR to a smaller query region SR, and search for a match in database 20 for smaller region SR. In the example shown in FIG. 2, irregularity detector 30 proceeds to finds a database match $SRm_{Pa}$ for smaller query region $SR_{Pa}$. In accordance with the present invention, as explained previously hereinabove, a reduction in size of the matched query region around a query point, such as the reduction in size from region $LR_{Pa}$ to region $SR_{Pa}$ around point Pa, may carry a penalty for the "likelihood" score for that query point. As explained hereinabove, likelihood, in accordance with the present invention, may provide a measure of the probability that regularity or validity is indicated.

In accordance with the present invention, irregularity detector 30 may continue to process additional points in the query image until it ultimately makes a determination about the regularity of the query on the basis of the likelihood scores calculated for component points in the query.

Applicants have realized that in order to make the inference by composition method provided by the present invention and described hereinabove with respect to FIGS. 1 and 2 practicable, the method by which portions of query images are compared with portions of database images and deemed similar or dissimilar, must be able to account for the fact that human behaviors and natural spatial structures may never repeat identically. For example, in surveillance applications, it may be desirable that a query video sequence of a person walking be recognized as valid, even if the examples of valid walking sequences in the database vary with respect to the query. Variations in walks among different people may easily be due to differing physical characteristics such as height or weight, or different walking styles, including speed or the concurrent movement of other body parts, such as arms or hips. Different walking styles may even account for varying examples of walking executed by the same person.

Applicants have realized that this aspect of detecting irregularities in data may be addressed by allowing for small non-rigid deformations in chunks of database data when they are being compared with a region in a query image. Applicants have further realized that an appropriate measure of flexibility may be provided by using ensembles of patches to represent the data under analysis.

In accordance with the present invention, a region LR under consideration in a query, surrounding a data point P, such as exemplary region $LR_{Pk}$ or $LR_{Pa}$ of FIG. 2, may be represented as an ensemble of patches by breaking the region down into an ensemble of many (e.g., hundreds) of small patches at multiple scales with their relative geometric positions. Exemplary ensemble of patches $y_{Pk}$ is shown to represent region $LR_{Pk}$ in FIG. 2. It will be appreciated that while an ensemble of patches may contain hundreds of patches in accordance with the present invention, a minimal number of patches are illustrated in FIG. 2 and wherever ensembles of patches are illustrated in the figures, for the sake of clarity.

Figure 3:
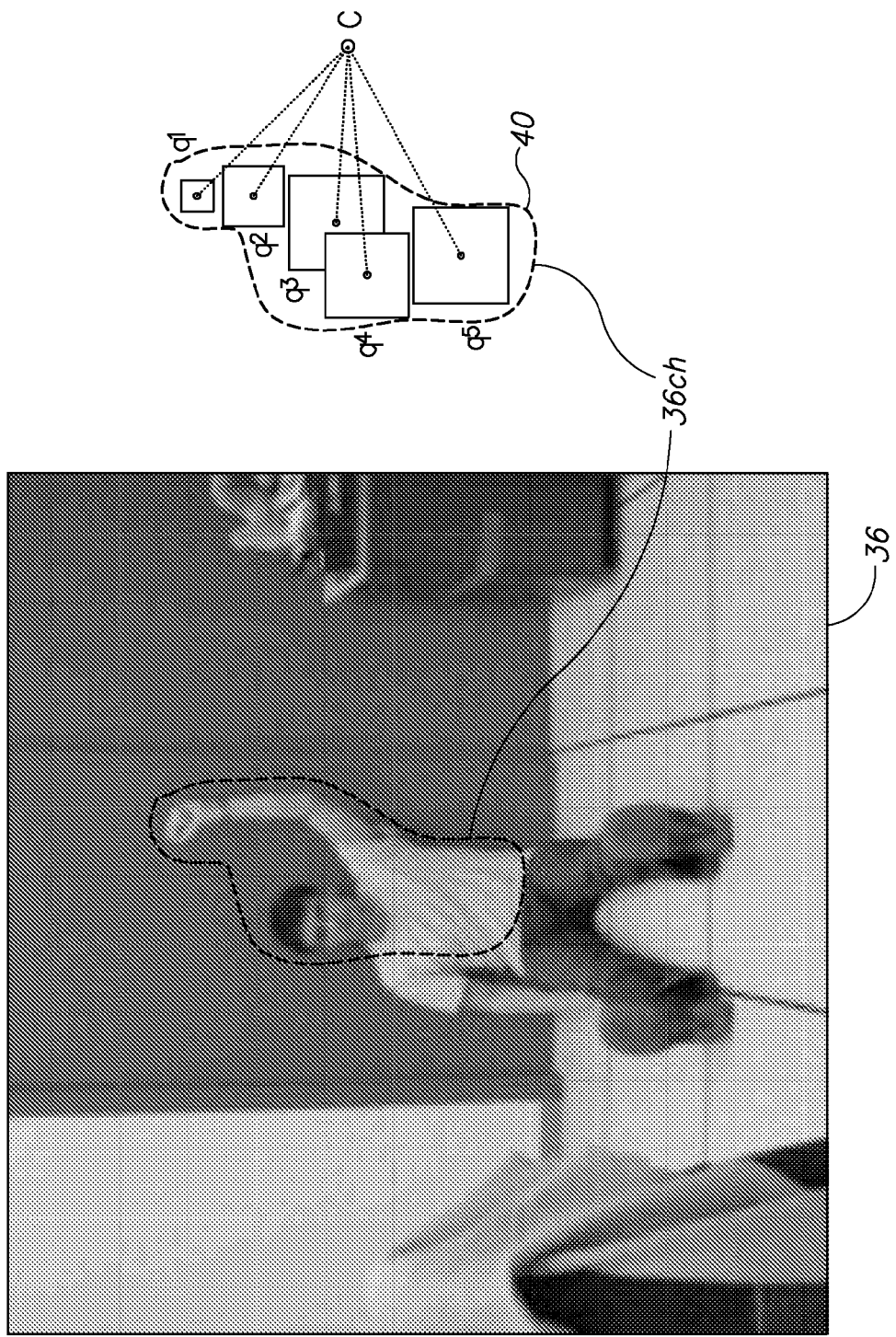
FIG. 3 is an illustration of an exemplary ensemble of patches representing a detail of an image appearing in FIG. 2.

An additional exemplary ensemble of patches is shown in FIG. 3, reference to which is now made. As shown in FIG. 3, image chunk 36ch of FIG. 1 is represented by ensemble of patches 40. The patches in an ensemble, such as those in ensemble of patches 40, may be denoted $q^1, q^2, \ldots q^n$, as shown in FIG. 3. An arbitrary reference point c, as shown in FIG. 3, may serve as the "origin" of the local coordinate system, and may thus define the relative positions of the patches within the ensemble. For example, reference point c may be the center of the ensemble. Alternatively, reference point c may be any other point which may serve as a reference point for the ensemble.

Figure 4:
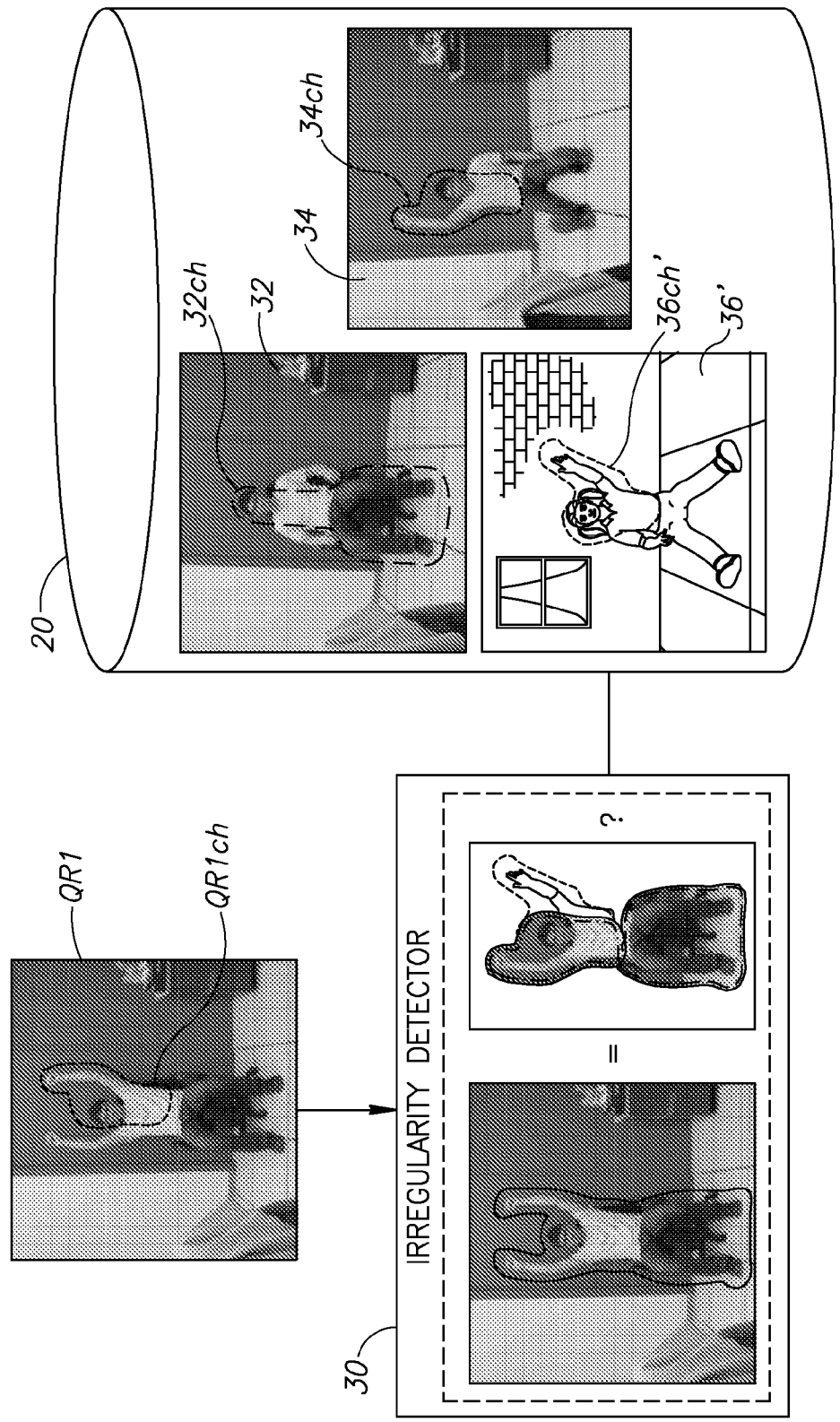
FIG. 4 is an illustration of the irregularity detection process of FIG. 1, with alternative referential data.

In the inference process provided by the present invention, irregularity detector 30 may search, in database 20, for a similar geometric configuration of patches with similar properties (e.g., of behavior, or of appearance) to query ensemble $y_P$, while allowing for small local misalignments in the relative geometric arrangement of the patches. This is illustrated in FIG. 4, reference to which is now made. FIG. 4 illustrates a search by irregularity detector 30 which is similar to the search shown in FIG. 1, except that image 36 in database 20 of FIG. 1 is replaced by image 36' in FIG. 4.

As shown in FIG. 4, the position of the person shown sitting with her left arm raised in image 36' is substantially similar to the position of the person shown sitting with his left arm raised in image 36 in FIG. 1. However, the person shown in image 36' is not the same person shown in query image QR1 and images 32, 34 and 36 in FIG. 1. Image 36' shows a woman who is shorter and fatter as well as of a different gender than the man shown in image 36. Whether due to the physical differences between the man and the woman, or to a slightly different position in which the woman is holding up her arm vis-a-vis the man, or a combination of both, it may be seen in FIG. 4 that the overall configuration of the raised left arm in image 36' is similar, but somewhat misaligned with respect to the configuration of the raised left arm of the man in query QR1.

In accordance with the inference process described hereinabove, and the mathematical algorithms provided in the present invention, which will be discussed later in further detail with respect to FIG. 7, irregularity detector 30 may determine the extent to which the ensemble of patches representing database data chunk 36$ch$' provides a match for the ensemble of patches representing query data chunk QR1$ch$, the data chunk in query QR1 for which data chunk 36$ch$' ostensibly provides a match.

Figure 5:
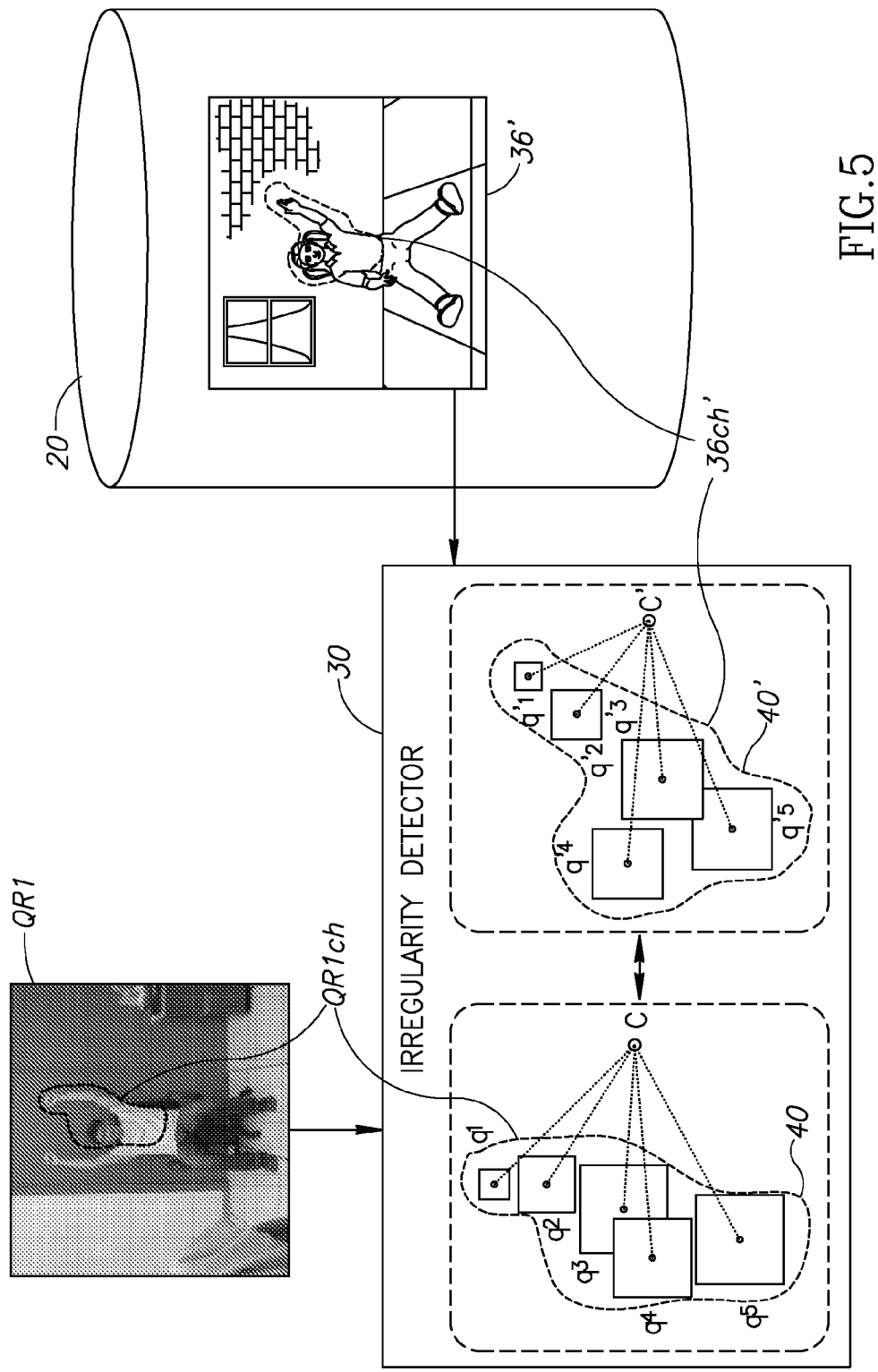

These two ensembles of patches are shown adjacent to one another in FIG. 5, reference to which is now made. Ensemble of patches 40, previously shown in FIG. 3, represents data chunk QR1$ch$ (FIG. 4) which is substantially identical to data chunk 36$ch$ shown in FIGS. 1 and 3. Ensemble of patches 40' is shown to represent data chunk 36$ch$'. As shown in FIG. 5, ensemble of patches 40 comprises patches $q'^1$, $q'^2$, $q'^3$, $q'^4$ and $q'^5$ while ensemble of patches 40' comprises corresponding patches $q'^1$, $q'^2$, $q'^3$, $q'^4$ and $q'^5$. While the similarity of the images of the upraised left arm in query QR1 and image 36' is schematically illustrated in FIG. 5 by the similarity between the corresponding patches in the two representative ensembles (40 and 40' respectively), the misalignment between the two images is also schematically illustrated in FIG. 5 by the translational shifts in the geometric configuration of the patches in ensemble 40' with respect to the geometric configuration of the patches in ensemble 40.

In accordance with the mathematical algorithms provided in the present invention, irregularity detector 30 may determine the extent to which ensembles of patches 40 and 40' are similar, based on properties of appearance, behavior, etc., while allowing for small local misalignments in the relative geometric arrangement of the patches. That is, irregularity detector 30 may detect small non-rigid deformations in these exemplary images, yet still determine that the images are similar enough such that the query image is provided support by the database image, and may be considered valid and not irregular. It will be appreciated that this may be the case for any data compared by irregularity detector 30 in accordance with the present invention. Thus, the present invention may provide a practicable method for detecting irregularities in data which is not hindered by the fact that human behaviors and natural spatial structures may never repeat identically.

Figure 6:
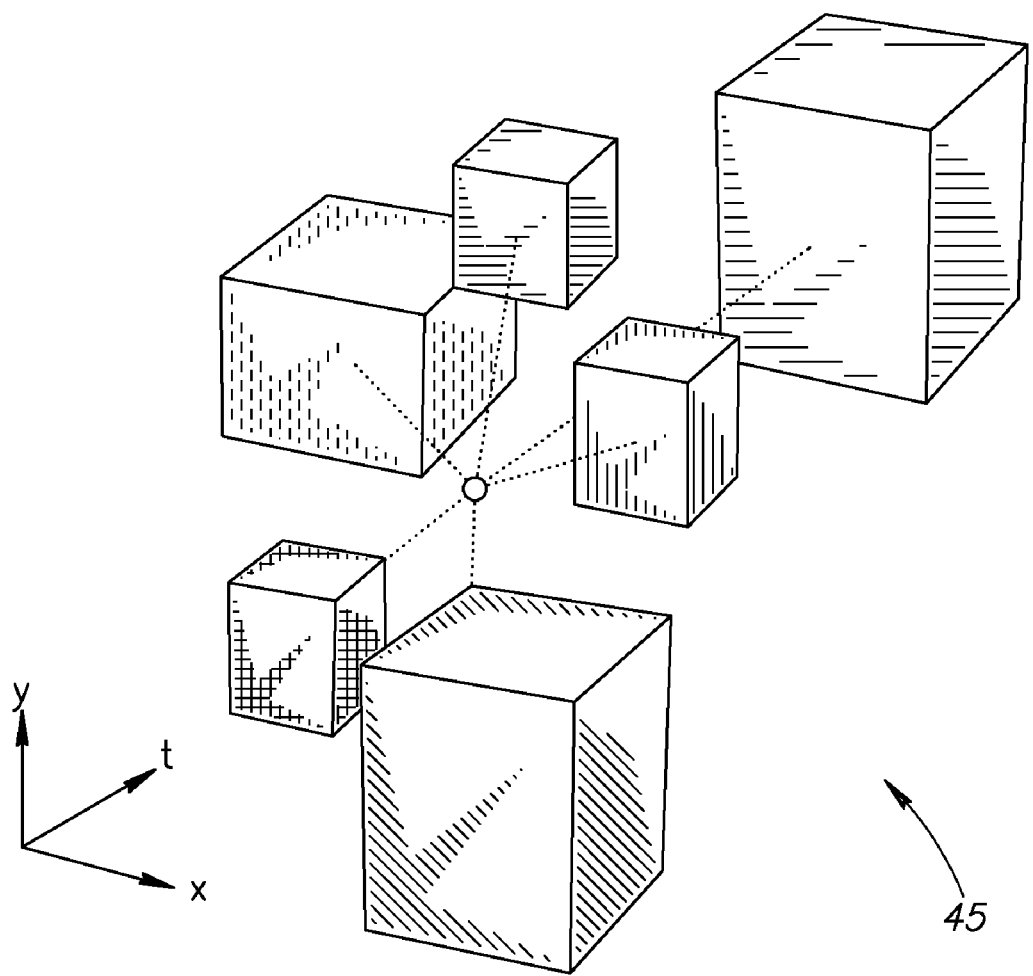
FIG. 6 is an illustration of an exemplary ensemble of patches composed of spatio-temporal patches, employed in accordance with the present invention for processing 3-dimensional data.

It will be appreciated that ensembles of patches such as ensemble of patches 40 and 40' (FIG. 5), which are composed of spatial patches, may be employed for processing 2-dimensional image data. For the analysis of video sequences, in which large chunks in space-time may be compared, the ensembles of patches employed may be composed of spatio-temporal patches, which may capture information about dynamic behaviors. An exemplary ensemble 45 of spatio-temporal patches is shown in FIG. 6, reference to which is now made. In the case of ensembles of spatio-temporal patches, such as ensemble 45, the multiple scales of the spatio-temporal patches may be multiple space-time scales.

In the prior art, the idea of composing new data from example patches was proven useful for a variety of tasks (e.g., as taught by Efros et al. (in "Texture synthesis by non-parametric sampling", *ICCV,* 1999), Freeman et al. (in "Learning low-level vision", *IJCV,* 2000), and Wexler et al. (in "Space-time video completion", *CVPR*04, 2004)). Nevertheless, these methods did not impose any geometric restriction on the example patches used for construction, i.e., their relative positions and distances in the database, as it was not necessary for their purpose. However, Applicants have realized that it is crucial for the purpose of detecting irregularities. This is because often, the only real cue of information for distinguishing between a likely and an unlikely phenomenon is the degree of fragmentation of its support in the database. For example, the stretched arm of a man holding a gun is similar to an instantaneous stretching of the arm while walking, but their regions of support in time are very different.

Capturing the geometric relations of patches was identified as being important for the task of class-based object recognition by Bart et al. (in "Class-based matching of object parts", *VideoRegister*04, 2004), Fergus et al. (in "Object class recognition by unsupervised scale-invariant learning", *CVPR*03, 2003), Felzenszwalb et al. (in "Pictorial structures for object recognition", *IJCV,* 2005), and Leibe et al. (in "Combined object categorization and segmentation with an implicit shape model", ECCV04, 2004). However, those approaches are not suitable for the present invention for two reasons:

Firstly, their geometric configurations are restricted to a relatively small number of patches, and therefore cannot capture subtle differences which are crucial for detection of irregularities.

Secondly, those configurations were pre-learned for a small number of pre-defined classes of objects, whereas the framework provided by the present invention may be applicable to data for which classes of objects have not been pre-defined. While the geometric constraints of Leibe et al. are more flexible, allowing the recognition of new object configurations from just a few examples, their method is still limited to a set of predefined object classes with predefined object centers. This is not suitable for detecting irregularities, where there is no notion of object classes.

"Video Google", by Sivic et al. ("Video google: A text retrieval approach to object matching in videos", *ICCV,* 2003), imposes geometric constraints on large collections of non class-based descriptors, and searches for them very efficiently. However, those descriptors are spatial in nature and the search is restricted to individual image frames, thus not allowing behaviors to be captured.

It will be appreciated that in order for the inference process provided by the present invention to be performed in reasonable lengths of time, information about the small patches and their relative arrangement must be efficiently stored in and extracted from the database. In accordance with a preferred embodiment of the present invention, for each small patch extracted from the examples, a descriptor vector may be computed and stored, along with the absolute coordinates of the patch (spatial or spatio-temporal coordinates). Thus, the relative arrangement of all patches in the image/video database may be implicitly available. The inference algorithm provided by the present invention may then take an ensemble of patches from the query (e.g., ensemble of patches 40 of FIG. 5) and search the database for a similar configuration of patches (both in the descriptors and in their relative geometric arrangement). To allow for fast search and retrieval, those patches may be stored in a multi-scale data structure.

Figure 7:
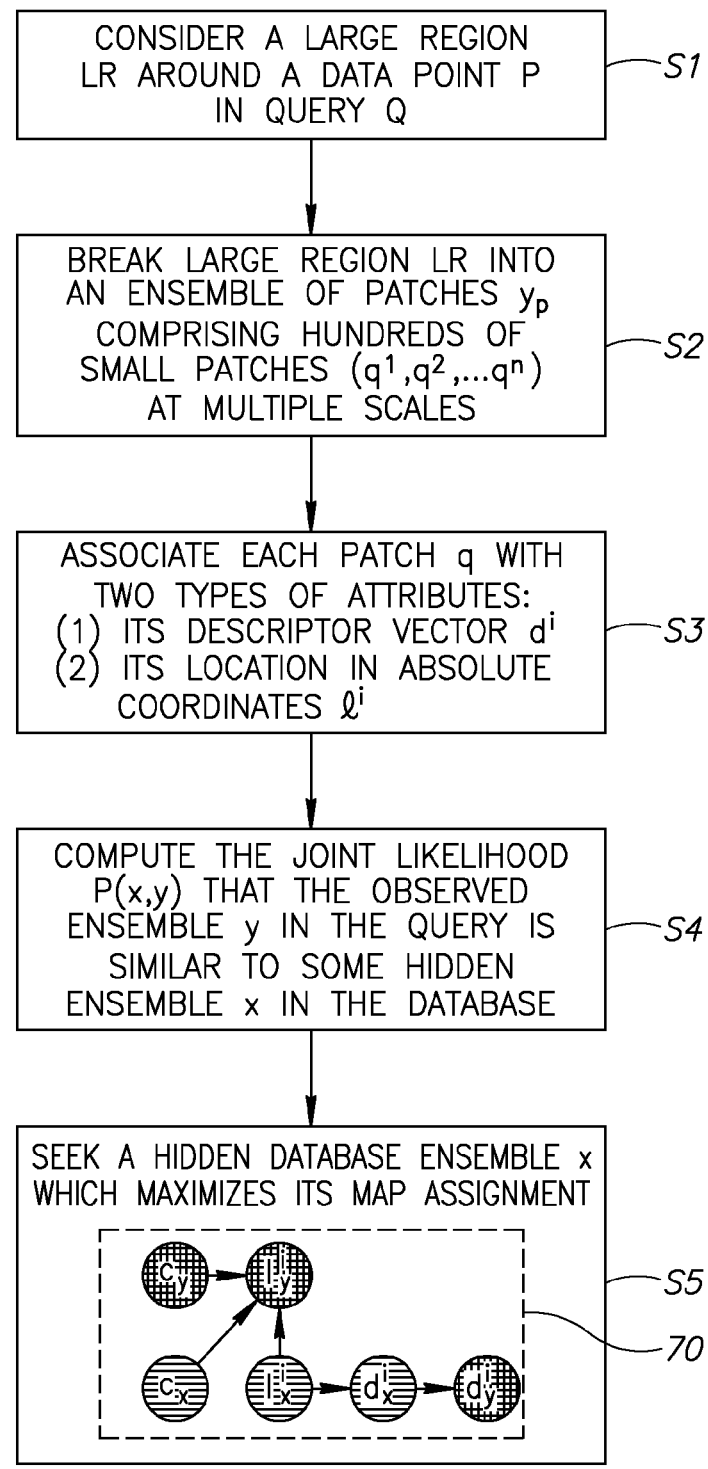
FIG. 7 is a flow chart illustration of the method steps performed by the irregularity detector of FIG. 1.

FIG. 7, reference to which is now made, is a flow chart illustration of the method steps of the inference process provided by the present invention. In the first method step, step S1, as described previously with respect to FIG. 2, a large region LR surrounding an individual data point may be considered. In the second method step, step S2, also described previously with respect to FIG. 2, large region LR may be broken down into a representative ensemble of patches ($q^1$, $q^2$, ... $q^n$) comprising many (e.g. hundreds) of small patches at multiple scales. In the third method step, step S3, each patch q may be associated with two types of attributes.

One type of attribute may be a descriptor vector $d^i$, and the second type of attribute may be a location in absolute coordinates $l^i$. The location may be in space (e.g., images), space-time (e.g., video), 3D space (e.g., volumetric data, 3D data), time (e.g., voice, E.K.G., etc.) or 3D space+time (e.g., fMRI).

In the fourth method step, step S4, irregularity detector 30 may compute the joint likelihood P(x,y) that ensemble y, an exemplary ensemble of patches within query Q, is similar to some hidden ensemble x in the database. This similarity requirement applies to both attribute types of the patches in ensembles x and y. That is, for ensembles x and y to be similar, both the descriptor values $d^i$ and the relative positions of the patches in ensembles x and y must be similar.

Applicants have realized that the joint likelihood P(x,y) may be factored as:

$$P(x,y)=P(y|x)P(x)$$

where the modeling of P(y|x) resembles the probabilistic modeling of the "star graph" taught by Felzenszwalb et al in the article mentioned hereinabove. However, Felzenszwalb et al. computes P(y;θ) in a class-based setting, where θ is a pre-learned set of parameters of a given patch-constellation of an object-class. In the present invention, on the other hand, there is no notion of objects, i.e., there is no prior parametric modeling of the database ensemble x. Thus, θ is undefined, and P(x) is estimated non-parametrically directly from the database of examples.

To this end, the descriptor vector of the i-th observed patch in y may be denoted $d_y^i$, and its location (in absolute coordinates) may be denoted $l_y^i$. Similarly, the descriptor vector of the i-th hidden (database) patch in x may be denoted $d_x^i$, and its location may be denoted $l_x^i$. The "origin" points of the observed and hidden ensembles may be denoted $c_y$ and $c_x$ respectively. Applicants have realized that the following equation (Eq. (1)) may then be used to describe the similarity between any such pair of ensembles y and x:

$$P(x,y)=P(c_x,d_x^1,\ldots,l_x^1,\ldots,c_y,d_y^1,\ldots,l_y^1,\ldots) \quad \text{Eq. (1)}$$

Several simplifying statistical assumptions make the computation of the likelihood in Eq. (1) more tractable. Firstly, a standard Markovian assumption, such as taught by Freeman et al. in the article mentioned hereinabove, is made, wherein for a hidden database patch and its descriptor $d_x^i$, the corresponding observed descriptor $d_y^i$ is assumed to be independent of the other patch descriptors. It will be appreciated that while this assumption is not valid in the case of overlapping patches, it is still useful in practice. The similarity between descriptors may then be modeled as provided in the following equation (Eq. (2)):

$$P(d_y^i|d_x^i)=\alpha_1 \text{sim}(d_y^i,d_x^i) \quad \text{(Eq. (2))}$$

where sim is the general similarity function and $\alpha_1$ is a normalization constant dependent on sim. The similarity function can be defined using a dissimilarity (e.g. distance) function in the form of the following equation (Eq. (3)):

$$\text{sim}(d_y^i,d_x^i)=\exp^{-dis(d_y^i,d_x^i)} \quad \text{(Eq. (3))}$$

A common dissimilarity function is the weighted $L^2$ distance (Eq. (4)):

$$dis(d_y^i,d_x^i)=(d_y^i-d_x^i)^T S_D^{-1}(d_y^i-d_x^i) \quad \text{(Eq. (4))}$$

In this case, the resulting distribution is Gaussian where $S_D$ is a constant covariance matrix which determines the allowable deviation in the descriptor values. Given the relative location of the hidden database patch $(l_x^i - c_x)$, the relative location of the corresponding observed patch $(l_y^i - c_y)$ is assumed to be independent of all other patch locations. This assumption enables the comparison of the geometric arrangements of two ensembles of patches with enough flexibility to accommodate for small changes in viewing angle, scale, pose and behavior, the significance of which was discussed previously with respect to FIGS. 4 and 5. Thus, as expressed in the following equation (Eq. (5)):

$$P(l_y^i|l_x^i,c_x,c_y)=\alpha_2 \cdot \exp(-((l_y^i-c_y)-(l_x^i-c_x))^T S_L^{-1}((l_y^i-c_y)-(l_x^i-c_x))) \quad \text{(Eq. (5))}$$

where $\alpha_2$ is a constant, and $S_L$ is a constant covariance matrix, which captures the allowed deviations in the relative patch locations. (In this variation, the dependency in relative locations is modeled using a Gaussian, however the model is not restricted to this particular approach.)

Subsequent to the above described modeling of the relations between attributes across ensembles, (descriptors: $d_y^i$, $d_x^i$, and relative locations: $(l_y^i - c_y)$, $(l_x^i - c_x)$), the relations with the hidden ensemble remain to be modeled. Specifically, the relations between a patch descriptor $d_x^i$ to its location $l_x^i$ remain to be modeled.

In the general case, this relation is highly non-parametric, and hence cannot be modeled analytically (in contrast to class-based approaches as in Fergus et al. and Felzenszwalb et al.). Applicants have realized that it may, however, be modeled non-parametrically using examples from the database, as expressed in the following equation (Eq. (6)):

$$P(d_x|l_x) = \begin{cases} 1 & (d_x, l_x) \in DB \\ 0 & \text{otherwise} \end{cases} \quad \text{(Eq.(6))}$$

where $d_x$ and $l_x$ are an arbitrary descriptor and location.

It may then be assumed that $c_y$ is independent from $c_x$ (i.e. shift invariance between query and database) and that therefore, $P(c_x,c_y)=P(c_x)P(c_y)$. Moreover, a uniform prior distribution for $c_x$ and $c_y$ (local origin points) is assumed, i.e., it is assumed that there is no prior preference for the location of the ensemble in the database or in the query. The relation between all of the above-mentioned variables is illustrated in the Bayesian network shown in diagram 70 in FIG. 7, which is discussed in greater detail hereinbelow with respect to method step S5 of FIG. 7.

Thus, Applicants have realized that for an observed ensemble y and a hidden database ensemble X, the joint likelihood P(x,y) of Eq. (1) may be factored using Eqs. (2, 5 and 6) as expressed in the following equation (Eq. (7)):

$$P(c_x, d_x^1, \ldots, l_x^1, \ldots, c_y, d_y^1, \ldots, l_y^1, \ldots) = \quad (\text{Eq.}(7))$$

$$\alpha P(c_y|c_x)P(c_x)\prod_i P(l_y^i|l_x^i, c_x, c_y)P(d_y^i|d_x^i)P(d_x^i|l_x^i)$$

Returning now to FIG. 7, in accordance with the fifth method step S5 of the present invention, step S5, irregularity detector 30 may then seek, for a given observed ensemble, (e.g., ensemble $y_{Pk}$ in FIG. 2) a hidden database ensemble which maximizes its MAP (maximum a-posterior probability) assignment. This may be done using the statistical model described hereinabove, which has a simple and exact Viterbi algorithm. According to Eq. (7) the MAP assignment can be written as:

$$\max P(c_x, d_x^1, \ldots, l_x^1, \ldots, c_y, d_y^1, \ldots, l_y^1, \ldots) =$$

$$\alpha \prod_i \max_{l_x^i} P(l_y^i|l_x^i, c_x, c_y) \max_{d_x^i} (d_y^i|d_x^i) P(d_x^i|l_x^i)$$

Applicants have realized that this expression may be phrased as a message passing (Belief Propagation, as in Yedidia et al. *Understanding belief propagation and its generalizations*, pages 239-269, 2003) algorithm for a probabilistic graphical model, which is shown in diagram 70 in FIG. 7. In diagram 70, observed variables $c_y$, $l_y^i$ and $d_y^i$ are marked with a grid like hatching pattern, while hidden variables $c_x$, $l_x^i$ and $d_x^i$ are marked by a horizontal hatching pattern. First the message $m_{dl}^i$ passed from node $d_x^i$ to node $l_x^i$ regarding its belief in the location $l_x^i$:$m_{dl}^i(l_x^i)$ is computed for each patch, that is, $$\max_{d_x^i}(d_y^i|d_x^i)P(d_x^i|l_x^i).$$

Specifically, for each observed patch, all the candidate database locations $l_x^i$ with high descriptor similarity are computed. Next, for each of these candidate database locations, a message is passed about the induced possible origin locations $c_x$ in the database:

$$m_{lc}^i(c_x) = \max_{l_x^i} P(l_y^i|l_x^i, c_x, c_y)m_{dl}(l_x^i).$$

At this point, a candidate list of origins suggested by each individual patch is accrued. The likelihood of an entire ensemble assignment may then be computed by multiplying the beliefs from all the individual patches in the ensemble:

$$m_c(c_x) = \prod_i m_{lc}^i(c_x).$$

Applicants have realized that a naïve implementation of the above message passing algorithm may be very inefficient, since independent descriptor queries are performed for each patch in the observation ensemble, regardless of answers to previous queries performed by other patches. However, these patches are related by a certain geometric arrangement. Applicants have realized that this knowledge may be used to perform a more efficient search by progressive elimination of the search space in the database.

In accordance with the progressive elimination process provided in the present invention, the message $m_{dl}^i$ for a small number of patches (e.g., 1) may be computed. The resulting list of possible candidate origins may then induce a very restricted search space for the next patch. The next patch, in turn, may eliminate additional origins from the already short list of candidates, etc. Applicants have further realized that truncated Gaussian distributions (e.g., truncated after 4σ) may be used in order to speed-up the progressive elimination process.

Figure 8:
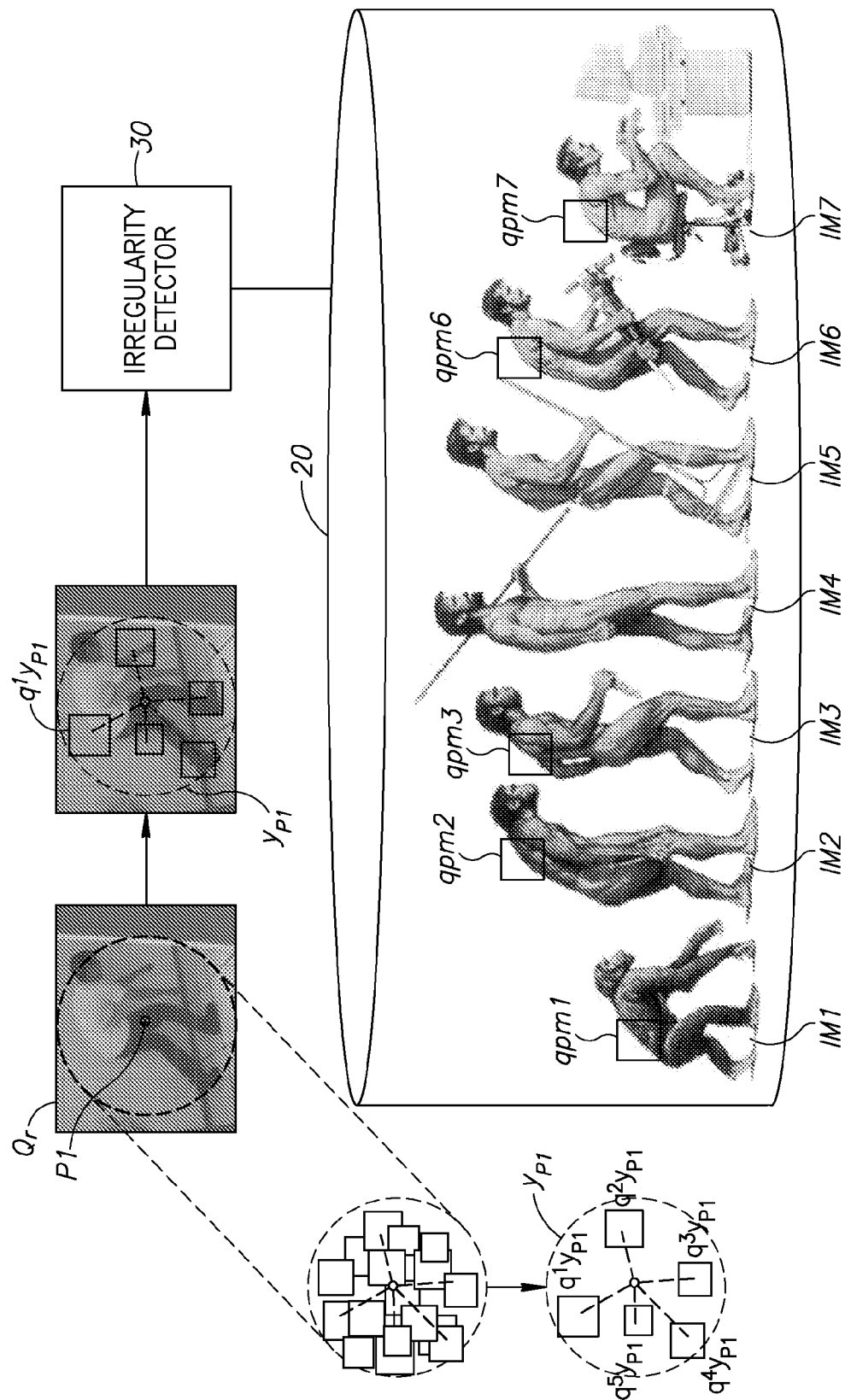
FIG. 8 is an illustration of a progressive elation process performed by the irregularity detector of FIG. 1.

The progressive elimination process provided by the present invention is illustrated in FIG. 8, reference to which is now made. In the example shown in FIG. 8, irregularity detector 30 is shown to conduct a search in database 20 for a hidden ensemble of patches $x_{P1}$ which may be a substantial match for ensemble of patches $y_{P1}$, which is shown in FIG. 8 to be the simplified schematic ensemble of patches representing large region $LR_{P1}$ in query Qr. As shown in FIG. 8, region $LR_{P1}$ is centered about query data point P1. Ensemble of patches $y_{P1}$ is shown in FIG. 8 to comprise component patches $q^1y_{P1}$, $q^2y_{P1}$, $q^3y_{P1}$, $q^4y_{P1}$, and $q^5y_{P1}$.

In accordance with the progressive elimination process provided in the present invention, the search illustrated in FIG. 8 may begin with a search for a match for a single patch in query ensemble $y_{P1}$. The exemplary search illustrated in FIG. 8 is shown to begin with a search for a match for patch $q^1y_{P1}$. It may be seen in FIG. 8 that this search yields matching patches qpm1, qpm2, qpm3, qpm6 and qpm7, in images IM1, IM2, IM3, IM6 and IM7 respectively, of database 20. It will be appreciated, as shown in FIG. 8, that images IM4 and IM5 are eliminated from the search space (for database ensemble $x_{P1}$ in database 20) in the search for a match for the first patch, patch $q^1y_{P1}$, since irregularity detector 30 failed to find a match for patch $q^1y_{P1}$ of query ensemble $y_{P1}$ in these two images. They are thus eliminated from the group of images which are candidates for containing an ensemble of patches $x_{P1}$ to match query ensemble of patches $y_{P1}$.

Figure 9:
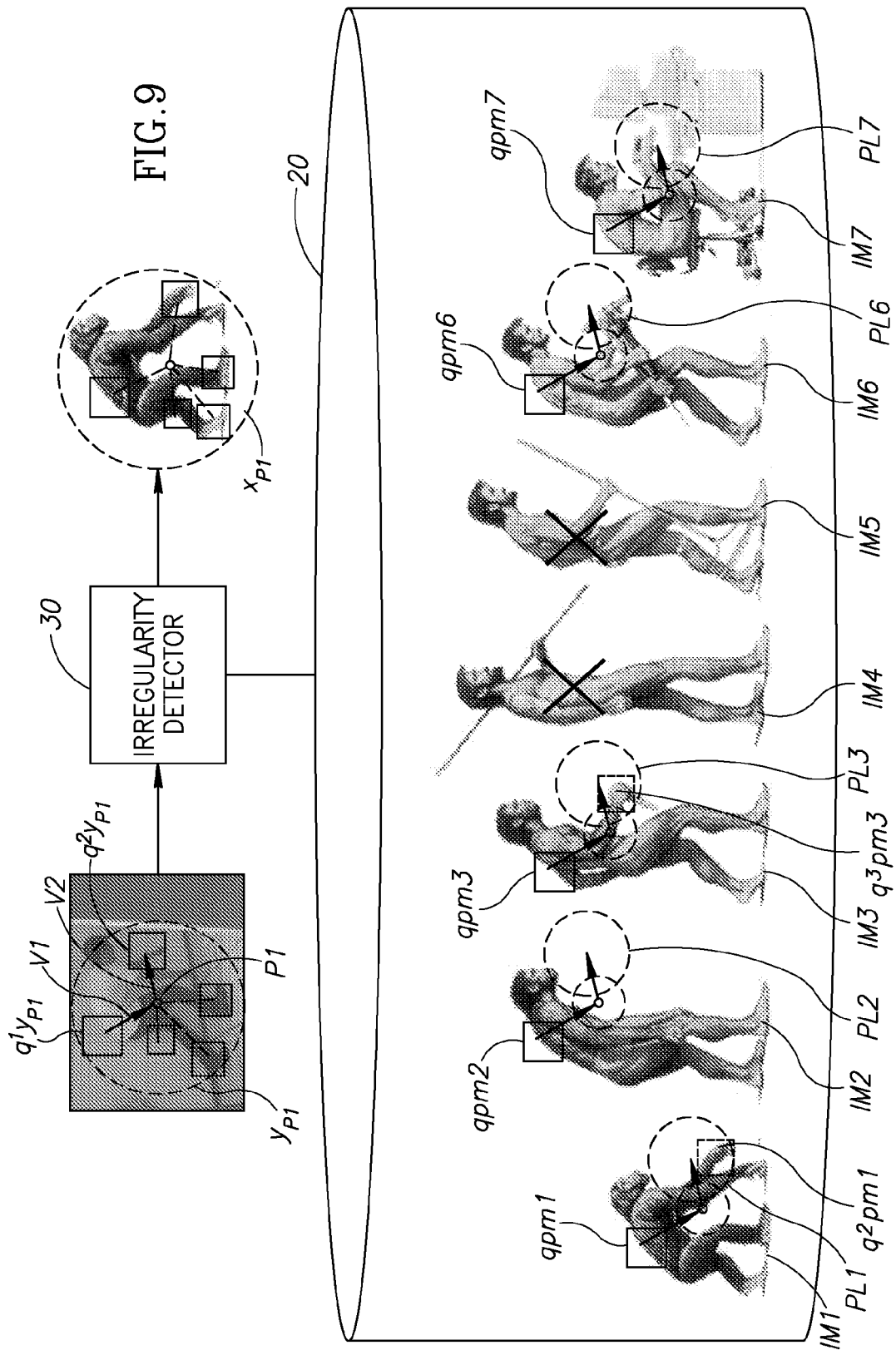
FIG. 9 is an illustration of the continuation of the progressive elimination process of FIG. 8.

In FIG. 9, reference to which is now made, the continuation of the search for a matching ensemble of patches $x_{P1}$ for ensemble of patches $y_{P1}$ is shown. FIG. 9 illustrates the progressive elimination process, which makes use of the information inherent in the geometric arrangement of the patches in a query ensemble of patches y, as described hereinabove and in accordance with the present invention, to narrow the search space searched in the database for a matching ensemble of patches x, in the inference process provided by the present invention.

Accordingly, the progressive elimination process may proceed with a search for a second patch of the query ensemble in accordance with the geometric relationship between the first patch and the second patch in the query ensemble. In the example shown in FIG. 9, the second patch which irregularity detector 30 searches for in accordance with a preferred embodiment of the present invention is patch $q^2y_{P1}$. Thus, the geometric relationship of interest in the search for the second patch is the geometric relationship between patches $q^1y_{P1}$ and $q^2y_{P1}$, which, as may be seen in FIG. 9, is defined by the summation of vectors V1 and V2. As shown in FIG. 9, vector V1 defines a distance and direction between patch $q^1y_{P1}$ and point P1. Similarly, vector V2 is shown to define a distance and direction between point P1 and patch $q^2y_{P1}$.

Irregularity detector 30 may then, in accordance with the present invention, proceed to search for matches for the second patch only in areas having a specific location with respect to the locations of the matches found for the first patch. Thus, the search space for ensemble of patches x in the database may already be narrowed during the search for the second patch, when the only permissible locations for a match for the second patch may be defined by the geometric relationship between the first patch and the second patch in ensemble y.

In the example shown in FIG. 9, the permissible locations for a match for the second patch, PL1, PL2, PL3, PL6 and PL7, are located in images IM1, IM2, IM3, IM6 and IM7 (respectively) relative to the locations of first patch matches qpm1, qpm2, qpm3, qpm6 and qpm7 (respectively). It may further be seen that this relative location is defined by the relationship between the first patch, patch $q^1y_{P1}$, and the second patch, patch $q^2y_{P1}$, in query ensemble $y_{P1}$. Thus, each of permissible locations PL1, PL2, PL3, PL6 and PL7 is located at the distance and direction dictated by the summation of vectors V1 and V2 from first patch matches qpm1, qpm2, qpm3, qpm6 and qpm7 respectively.

It will be appreciated that permissible locations PL1, PL2, PL3, PL6 and PL7 are not the size of second patch $q^2y_{P1}$, but are larger areas, indicating, rather than a precise location where a match for second patch $q^2y_{P1}$ must be found, a neighborhood within which a match for second patch $q^2y_{P1}$ may be found, and still fulfill the geometric relationship requirement with respect to first patch $q^1y_{P1}$.

It will be appreciated that this flexibility is provided in accordance with the present invention, as described hereinabove with respect to FIGS. 4 and 5, which allows for small non-rigid deformations between similar images, in order to provide a practicable method for detecting irregularities in data which is not hindered by the fact that human behaviors and natural spatial structures may never repeat identically.

As shown in FIG. 9, the search space in database 20 for ensemble of patches $x_{P1}$ is then reduced to images IM1 and IM3, as the only patches found to be similar to second patch $q^2y_{P1}$ in neighborhoods PL1, PL2, PL3, PL6 and PL7 are patch $q^2pm1$ in image IM1 and patch $q^2pm3$ in image IM3. As may be seen in FIG. 9, both patches appear to fulfill the requirement of substantial similarity to patch $q^2y_{P1}$ (i.e., all three patches comprise the image of a hand). Furthermore, as described hereinabove, when the measure for flexibility provided by the present invention is utilized, both patches are located within the restricted search space defined by the geometric relationship between patches $q^1y_{P1}$ and $q^2y_{P1}$ in ensemble of patches $y_{P1}$.

It is thus shown how the geometric relationship between the patches in an ensemble of patches may be used in accordance with the present invention to narrow the search space in the inference process provided by the present invention, and thus increase the efficiency with which the inference process may be performed. After the search for the second patch, patch $q^2y_{P1}$, as described with respect to FIG. 9, only images IM1 and IM3 remain as potential candidates for comprising an ensemble of patches $x_{P1}$ to match ensemble of patches $y_{P1}$.

It will be appreciated that the search for the remaining patches in query ensemble $y_{P1}$ may proceed in a similar manner as described hereinabove until the full matching ensemble $x_{P1}$ for query ensemble $y_{P1}$ is found. As shown in FIG. 9, image IM1 is found by irregularity detector 30 to contain an ensemble of patches $x_{P1}$ which provides a substantial match to ensemble of patches $y_{P1}$. As may be seen in FIG. 9, geometrically corresponding patches in the two ensembles are similar in appearance. While some small misalignments in the relative locations of the geometrically corresponding patches are also apparent, it is also evident that the overall geometric configuration of the patches in ensemble $y_{P1}$ has been matched in ensemble $x_{P1}$.

Thus, in the progressive elimination process provided in the present invention and described hereinabove with respect to FIGS. 8 and 9, if n is the number of patches in an ensemble (e.g., 256), and N is the number of patches in a database (e.g., 100,000 patches for a one-minute video database), then the search of the first patch may be O(N) in accordance with the present invention. Only the best M candidate origins may then be kept from the list indicated by the first patch (e.g., M=50). The second patch may then be restricted to the neighborhoods of M locations. The third may be restricted to a much smaller number of neighborhoods.

Thus, in the worst case scenario, the complexity is O(N)+ O(nM)≈O(N) O(N). In contrast, the complexity of the inference process in Felzenszwalb et al. and Leibe et al. is O(nN), while the complexity of the "constellation model" in Fergus et al. is exponential in the number of patches. Applicants have realized that the reduction in complexity provided by the present invention may be extremely important for enabling video inference with ensembles containing hundreds of patches.

Applicants have further realized that the first searched patches may be chosen from a coarse scale to further speed up the elimination process. This may be done for two reasons: Firstly, there is a much smaller number of coarse patches in a given database than fine patches, thus decreasing the effective N in the first most intensive step. Secondly, coarse patches may be more discriminative because they capture information from large regions. Candidate origins of database ensembles may thus be eliminated very quickly.

In accordance with a preferred embodiment of the present invention, processing of the coarse scale patches may proceed until all of the coarse scale patches in the observed ensemble have been processed. Then the candidate origin points may be projected to the next finer scale at which point processing of patches in the finer scale may continue. Processing in the multi-scale manner described hereinabove may continue until all the patches in the observed ensemble have been processed.

Applicants have realized that in some cases, it may not be possible to fully compose a query ensemble with a single database ensemble (e.g., due to partial occlusion). In these cases, (which may not be very frequent), in accordance with the present invention, the size of the observed region may be reduced, and the elimination process may be repeated without the discarded patches. The overall ensemble likelihood score may be penalized for each discarded patch in order to distinguish between these kind of ensembles and irregular (invalid) ensembles.

The spatial image descriptors of the small (e.g., 7×7) spatial patches of the present invention may be constructed in the following manner: Firstly, the spatial gradient magnitude may be computed for each pixel in the patch. These values may then be stacked in a vector, which may be normalized to a unit length. Such descriptors may be densely extracted for each point in the image. The descriptor extraction process may be repeated in several spatial scales of the spatial Gaussian pyramid of the image. Thus, a 7×7 patch extracted from a coarse scale may have a larger spatial support in the input image (i.e., in the fine scale).

The spatio-temporal video descriptors of the small (e.g., 7×7×4) spatio-temporal video patches of the present invention may be constructed from the absolute values of the temporal derivatives in all pixels of the patch. These values may then be stacked in a vector and normalized to a unit length. This descriptor extraction process may be repeated in several spatial and temporal scales of a space-time video pyramid. Thus, a 7×7×4 patch extracted from a coarse scale may have a larger spatial and larger temporal support in the input sequence.

It will be appreciated that the spatial image descriptors and the spatio-temporal video descriptors described hereinabove may be very simple descriptors in one embodiment of the present invention. In an alternative embodiment of the present invention, more sophisticated descriptors (e.g., as in Lowe, "Distinctive image features from scale-invariant keypoints", IJCV, 2004), may be used.

Applicants have realized that the inference by composition method provided by the present invention may form the basis for a single unified framework which may be used to treat a variety of different problems in Computer Vision as well as in other disciplines. For example, Applicants have realized that it may be implemented for detecting unusual image configurations, detecting spatial saliency in a single image, detecting suspicious behaviors in video and detecting behavioral saliency in video. These implementations are discussed hereinbelow with respect to FIGS. 10, 11, 12 and 13, reference to which is now made.

The implementation of the present invention for detecting unusual image configurations was introduced previously with respect to FIG. 1. Given a database of example images, irregularity detector 30, in accordance with a preferred embodiment of the present invention, may detect unusual things in a new observed image (such as objects never seen before, new image patterns, etc.) An additional example of detecting unusual image configurations in accordance with the present invention is shown in FIG. 10.

Figure 10:
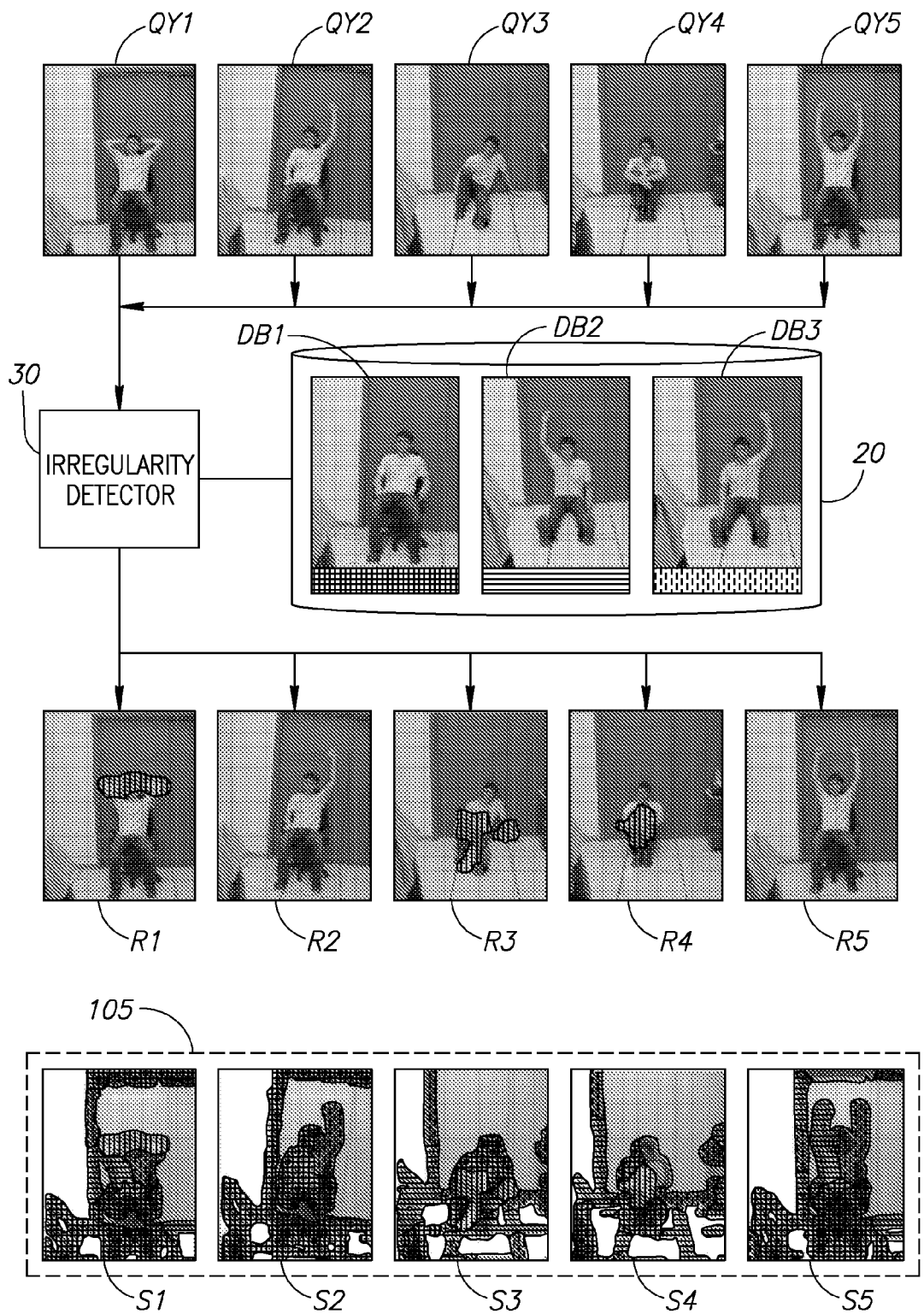
FIG. 10 is an illustration of one embodiment of the present invention employed for detecting unusual image configurations.

In the example shown in FIG. 10, database 20 comprises images DB1, DB2 and DB3, which each show a man in a different pose. Query images QY1, QY2, QY3, QY4 and QY5 each show an image of a man in one of various additional poses. As shown in result images R1, R2, R3, R4 and R5, irregularity detector 30 may, in accordance with a preferred embodiment of the present invention, be able to detect new valid poses (e.g., a man sitting on a chair with one arm up (Query QY2), a man sitting on a chair with both arms up (Query QY5), as well as to detect "unfamiliar" (i.e. irregular) portions of the query images.

It may be seen in result images R2 and R5, which show that no irregular portions of query images QY2 and QY5 were detected, that these valid poses were automatically inferred from the database by irregularity detector 30, even though these particular poses had never been seen before. The hatching shown in result images R1, R3 and R4 indicate the portions of the query poses which could not be inferred by irregularity detector 30 from database images DB1, DB2 and DB3, and are therefore detected by irregularity detector 30 as being irregular.

Diagram 105 in FIG. 10 shows the results of an analysis of queries QY1 QY2, QY3, QY4 and QY5 by irregularity detector 30 in terms of the database image which provided most evidence for each pixel in the query images (i.e., it tells which database image contains the largest most probable region of support for that pixel. It will be appreciated however, that these are not the regions of support themselves). Uniform patches (with negligible image gradients) may be assumed valid by default and discarded from the inference process (for added speedup).

Figure 11:
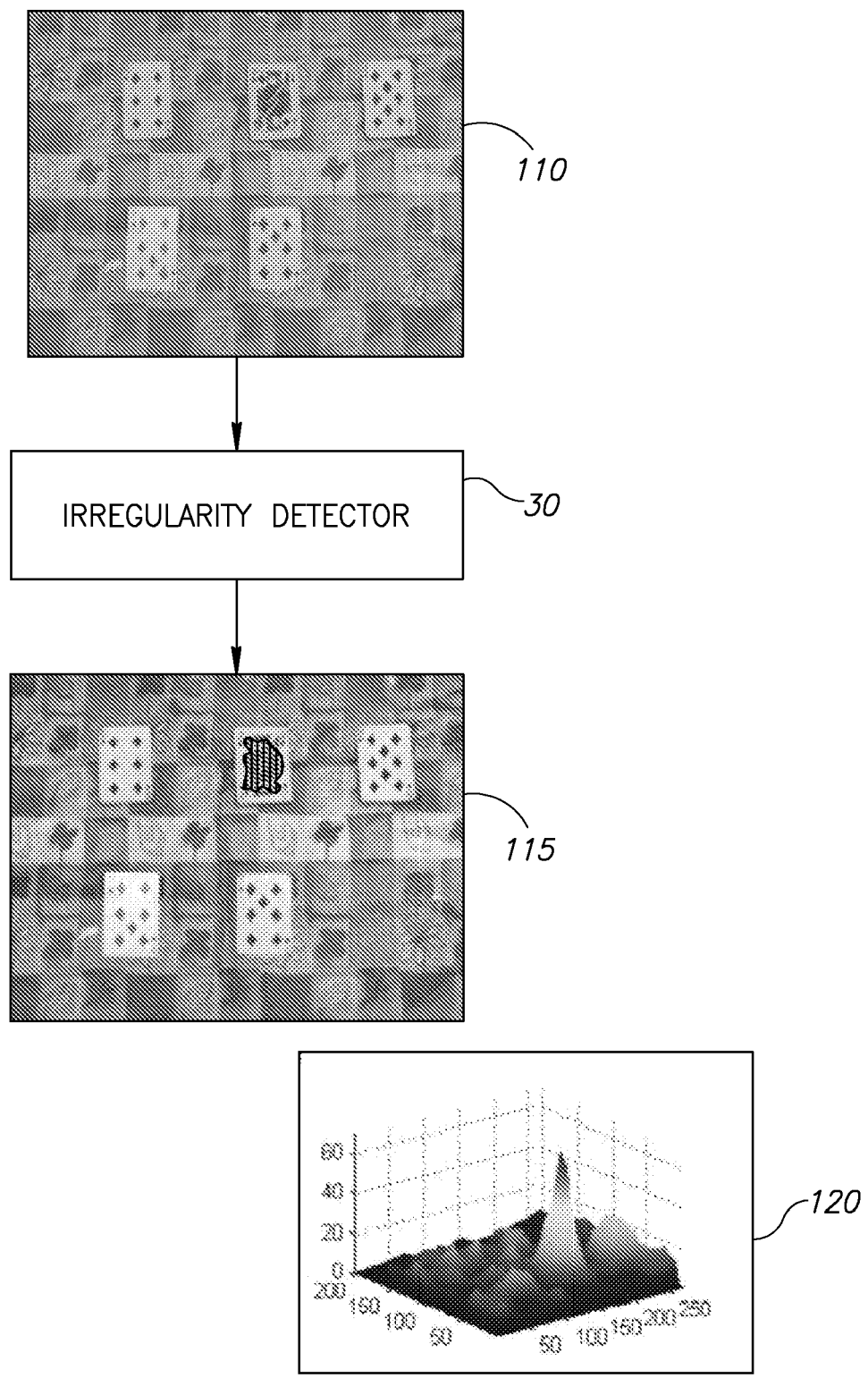
FIG. 11 is an illustration of an additional embodiment of the present invention employed for detecting spatial saliency in a single image.

The implementation of the present invention for detecting spatial saliency in a single image is described with respect to FIG. 11, reference to which is now made. Given a single image (i.e., no database), irregularity detector 30 may detect salient image regions, i.e., image regions which stand out as being different than the rest of the image. This analysis may not refer to any external examples (such as valid images in a database as described with respect to FIG. 10). Rather, a region of an image may, in turn, serve as the query with respect to the remaining portions of the same image. The remaining portions of the image may accordingly serve as the database for that particular region/query. This process may be repeated for a multiplicity of image regions in the image.

The "validity" of each component image region processed may thus be measured relative to the rest of the image. An image region may then be detected as salient if it cannot be explained by anything similar in other portions of the image. It will be appreciated that this process may be efficiently performed by adaptively adding and removing the appropriate descriptors from the "database" when proceeding from the analysis of one image region to the next.

FIG. 11 illustrates an example of spatial saliency detection in a single image in accordance with the present invention. In the example shown in FIG. 11, image 110 undergoes irregularity detection by irregularity detector 30. In image 110, five playing cards are shown lying face up on a patterned background. All of the five playing cards are of the diamond suit, but one card is a Jack, two cards are sevens, one card is a six and the other card is an eight. The patterned background is comprised of squares arranged in a grid-like pattern. The squares are distinguishable from one another because each one shows a particular design, or a particular shade of color or grayscale. Each square is not unique, however. There are several designs and shades which repeat in a regular pattern.

To a human observer of image 110, the Jack card stands out as salient. Although the patterned background abounds with images and shades of grayscale which contrast sharply with respect to one another, it is apparent to the human observer that these images are in fact, part of a background, a tablecloth perhaps, as the sharply contrasting images and shades of grayscale repeat in a regular pattern. Similarly, despite the variation in the numbered diamond cards (i.e., different Arabic numerals and different numbers of diamonds shown on the cards, and different positions of the cards in the case of the two sevens), they too fade into the anonymity of the background when they are viewed in the company of the Jack card.

As the only picture card in image 110, the Jack of Diamonds simply cannot hide in the crowd. When, in accordance with the present invention, irregularity detector 30 compares each of the regions in image 110 with respect to the remainder of the image, the region in which the Jack of Diamonds is located is identified as salient because no other region in the image contains something that looks like it. This result is shown in both images 115 and 120 in FIG. 11. Image 115 shows the resultant image of the irregularity detection conducted by irregularity detector 30, in which the salient region detected where the Jack of Diamonds is located is indicated by vertical hatching. Image 120 shows saliency values for every region in image 110 computed during the processing of image 110 by irregularity detector 30. A distinct peak of saliency is shown in the region of the Jack of Diamonds.

Figure 12:
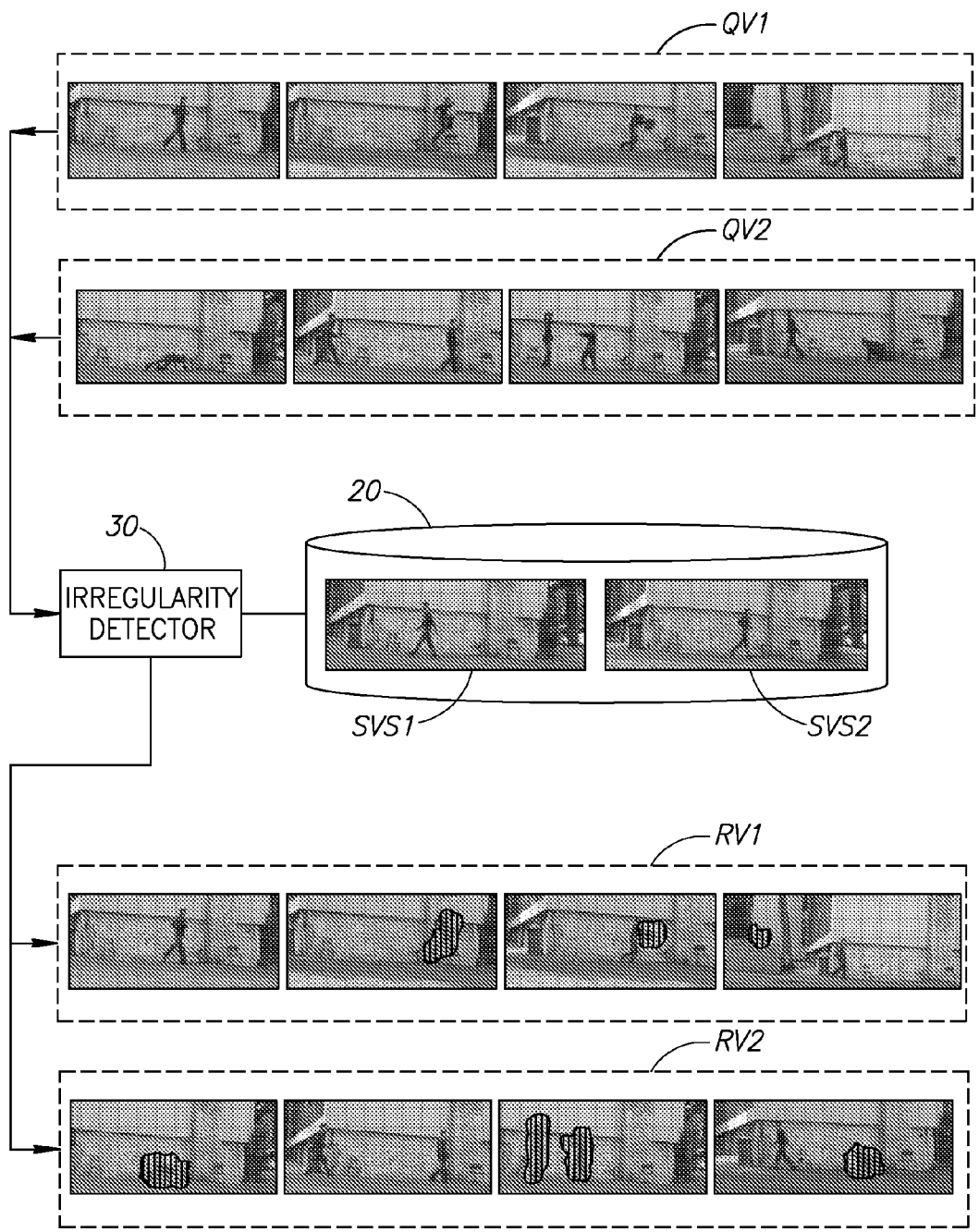
FIG. 12 is an illustration of an additional embodiment of the present invention employed for detecting suspicious behaviors in video.

The implementation of the present invention for detecting suspicious behaviors is described with respect to FIG. 12.

Given a database of sequences showing a few examples of valid behaviors, suspicious behaviors in a new video sequence may be detected in accordance with the method provided by the present invention. This may be accomplished despite the fact that all possible combinations of valid behaviors have not been previously seen, and despite there being no prior knowledge of what kind of suspicious behaviors may occur in the scene. These are automatically composed and inferred from space-time patches in the database sequence.

In the example shown in FIG. 12, database 20 comprises short video sequences SVS1 and SVS2 which show a single person walking and jogging respectively. In accordance with the present invention, irregularity detector 30 may, as shown in FIG. 12, detect suspicious behaviors in query sequences QV1 and QV2. The result of the algorithm provided by the present invention, and described previously with respect to FIG. 7, may be a continuous likelihood map. The results of the suspicious behavior detection performed by irregularity detector 30 on query sequences QV1 and QV2 are shown in result video sequences RV1 and RV2 respectively. The vertical hatching in result-video sequences RV1 and RV2 indicates where irregularity detector 30 detected suspicious behavior in query sequences QV1 and QV2.

As shown in result video sequence RV1, the suspicious behaviors detected in query sequence QV1 by irregularity detector 30 include a man jumping over a chair in the second frame, a man running with a bag in his hand in the third frame, and a man peeking out from behind a wall in the fourth frame. The irregularity of these areas in query sequence QV1 are apparent with respect to the valid database images of uneventful walking in sequence SVS1, and uneventful running in sequence SVS2.

As shown in result video sequence RV2, the suspicious behaviors detected in query sequence QV2 by irregularity detector 30 include a man crawling in the first frame, a man holding up another man with a gun in the third frame, in which both men are detected as suspicious, and another man crawling in the fourth frame. The irregularity of these areas in query sequence QV2 are also apparent with respect to the valid database images of uneventful walking in sequence SVS1, and uneventful running in sequence SVS2.

In the example shown in FIG. 12, a single threshold was selected for an entire video sequence query. It will be appreciated that more sophisticated thresholding methods (hysteresis, adaptive threshold, etc.) may also be used.

It will further be appreciated that an important property of the approach provided by the present invention is that the database can be incrementally and adaptively updated when new regular/valid examples are provided, simply by appending their raw descriptors and locations to the database. No "relearning" process may be needed. This may be essential in the context of detecting suspicious behaviors, should a detected suspicious behavior be identified as a false alarm. In such cases, the database may be updated by appending it with the new example, and the process may continue.

Figure 13:
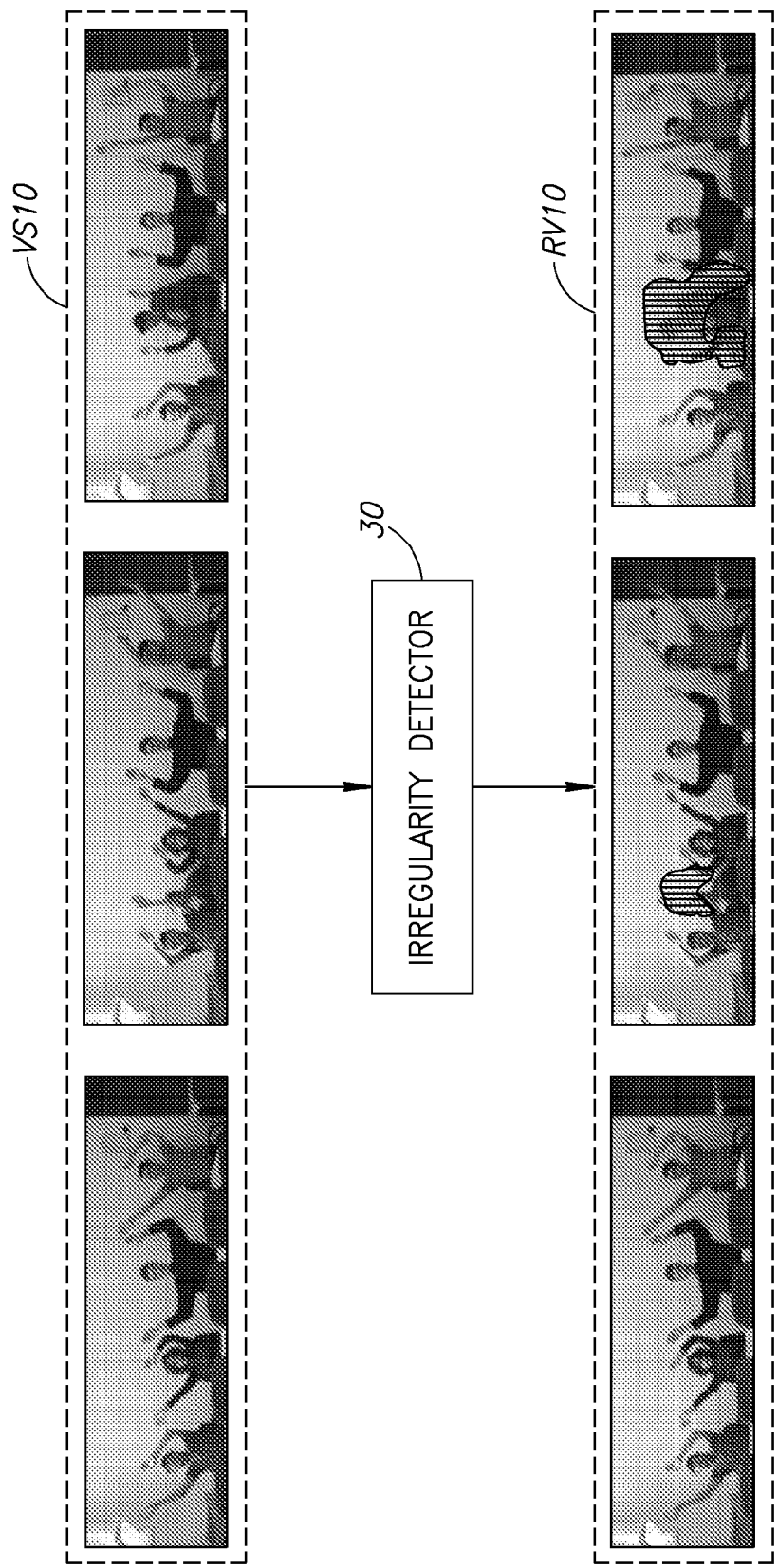
FIG. 13 is an illustration of an additional embodiment of the present invention employed for detecting behavioral saliency in video.

The implementation of the present invention for detecting behavioral saliency in video is described with respect to FIG. 13. As illustrated in FIG. 13, the present invention may detect salient behaviors in a single given video sequence without any database or prior information. For example, one person may be running amongst a cheering crowd. The behavior of this person is obviously salient. In this case, saliency is measured relative to all the other behaviors observed at the same time. In accordance with the present invention, to detect behavioral saliency in video, irregularity detector 30 may measure the "validity" of a space-time video segment (the "query") relative to the other video segments within a small window in time (the "database" for this particular video segment). This process may be repeated for a multiplicity of video segments. Salient behaviors may be detected as behaviors which cannot be supported by any other dynamic phenomena occurring at the same time in the video.

In the example shown in FIG. 13, a video sequence VS10 shows four people waving upraised arms from side to side in a substantially similar and synchronized manner. In accordance with the present invention, irregularity detector 30 may identify behaviors in video sequence VS10 which are detected as salient. The results of the salient behavior detection performed by irregularity detector 30 are shown in result video sequence RV10. The vertical hatching in result video sequence RV10 indicates where irregularity detector 30 detected salient behavior in video sequence VS10. It may be seen in result video sequence RV10 that the behavior of the man sneaking behind the group of arm-waving people is detected as salient by irregularity detector 30.

It will be appreciated that the inference by composition method provided by the present invention as described with respect to FIG. 7 has several limitations for which improvements, as described hereinbelow, are also included in the present invention. The first improvement pertains to the sensitivity of the method to occlusions, especially when the visible parts are very narrow. The second improvement pertains to the time and memory complexity of the method, which is proportional to the size of the database. The third improvement may enhance the generalization capabilities of the method, addressing restrictions of the likelihood estimations which may limit the ability to generalize from examples.

In accordance with the present invention, these limitations may be overcome, and the capabilities of the inference-by-composition approach provided by the present invention may be improved in several ways. As described further hereinbelow, the method provided by the present invention may be enhanced by improving the generalization capabilities of the inference approach, as well as the performance of the algorithm, thus enabling larger databases and observations within a reasonable running time.

In the composition algorithm provided by the present invention and described hereinabove, large fixed regions (e.g. 50×50 in image or 50×50×50 in video) may be composed using a single flexible ensemble. If composition fails, due to clutter or occlusion, the region size may be reduced, and composition may be retried, while the likelihood score may be penalized. This may make the composition too sensitive to outliers in the ensemble (due to proximity, clutter or occlusion). In order to make the composition algorithm more robust to a small number of outliers, the inference algorithm may be adjusted such that it removes patches from the observed ensemble if they make the composition fail, while expanding the ensemble to other directions.

One way in which outlier patches in an ensemble may be handled is to incorporate statistical mechanisms (such as RANSAC) to the choice of the seed patches of an ensemble. Alternatively, the most central patches in the ensemble may form a candidate seed. For each such seed, the processing of the other patches in the ensemble may continue, while the observed patches which contradict the candidate seed may be removed. As a result, by trying to compose a certain region several candidates may be obtained, each with a slightly different composed region. After a few candidate database ensembles are established, an attempt may be made to expand them by adding neighboring patches which will increase the composition score (in a region-growing like mechanism). The resulting ensemble shape will thus match a large object segment, and may be irregularly shaped.

Another limitation of the composition algorithm provided by the present invention as described hereinabove is the inability to compose a non-contiguous region. This property is problematic in cases of occlusion, where a large region might be split in the observation. Without enabling non-contiguous compositions, the observation may only be composed using small, low-likelihood regions.

A related limitation is that the model may restrict the maximal deformation relative to a certain reference point. While this deformation may enable significant flexibility for small parts, it may not be sufficient for composing larger objects or more complex behaviors using a single ensemble. For instance, a taller person may be locally composed using ensembles of a shorter person (i.e., scaling in the vertical direction), but the entire person may not be composed using a single ensemble. However, the fact that a taller person may be composed using ensembles of a shorter person with a similar relative constellation between the ensembles, brings higher evidence to the taller person than each of the individual ensembles. Applicants have realized that it is desirable for this higher evidence to result in a higher likelihood.

A solution to both problems may be provided by a feature which may be incorporated into the method provided in the present invention, which allows several ensembles to be joined in a hierarchical ensemble of ensembles, which may enable further location flexibility between ensembles. Using such a hierarchical representation, compositions may be produced from larger parts while retaining the reconstruction accuracy.

It will be appreciated that the approach provided by the present invention can handle many types of patch descriptors and similarity/dissimilarity functions (i.e., $d_x$, $d_y$, sim, dis in equations 2 and 3 respectively). These include descriptors based on raw data (e.g., color, gray level values), normalized raw data, based on gradient information or normalized gradients, based on filtered (linear and nonlinear) data, based on histograms, based on moments (e.g., as in VanGool et al., "Affine/photometric invariants for planar intensity patterns", 1996), SIFT-like descriptors (e.g., as in Lowe), etc. Descriptors can also be computed adaptively from the data (e.g., PCA) and quantized (e.g., K-means clustering, KDTree, etc.).

It will further be appreciated that the approach provided by the present invention can also handle descriptors designed to capture one aspect of a patch (e.g., explicit motion descriptors as in Efros et al. ("Recognizing action at a distance", ICCV, 2003), implicit motion descriptors as in Shechtman et al. ("Space-time behavioral correlation", CVPR05), or parametric motion). The present invention may also be capable of handling various similarity/dissimilarity measures between patch descriptors such as: sum-of-differences, correlation, normalized correlation, robust measures, histogram comparison measures (e.g., mutual information, chi-square, KL distance etc.) and others. Similarity measures specific to the descriptor type such as the motion consistency measure in Shechtman et al. may also be used, by embedding it in an appropriate similarity measure. This way, descriptors and similarity measures defined for certain aspects of the patch, such as: motion, shape, color, texture etc. may be used.

Moreover, combinations of descriptors may be aggregated into a single descriptor, with an appropriate similarity measure (e.g., sum/product/max/min of similarities). In order to explicitly handle small rotations and scale changes of patches, each descriptor can actually contain a descriptor set of rotated and scaled versions of the patch. The similarity function between such sets of descriptors is defined as the best between elements in the two compared sets:

$$\text{dist}(\bar{x},\bar{y}) = \min_{i,j} \text{dist}(x_i, y_j)$$

where $\bar{x}, \bar{y}$ are such descriptor-sets. Another option is to use scale and rotation invariant descriptors as in Lowe.

In an additional preferred embodiment of the present invention, both positive and negative examples may be used in the inference process. For instance, one database may comprise several video examples of suspicious behaviors, and another database may comprise several video examples of normal behaviors. In a case having both positive and negative examples, the likelihood of a new observation Y may be computed given the two databases $M_{regular}$, $M_{irregular}$. One approach to determine the regularity score of Y given both types of examples is to compute the likelihood ratio $P(Y|M_{regular})/P(Y|M_{irregular})$.

Applicants have realized that according to the inference algorithm for detecting saliency described with respect to FIG. 7, which computes the likelihood of the MAP (maximum a-posteriori probability) assignment for a certain region given the rest of the data, something that occurs once in the database examples will be determined to be equally as likely as something that occurs many times in the examples. However, there might be cases in which it would be desirable to average over all possible assignments, such that more frequent occurrences will be translated into a higher likelihood score.

Similarly, when a database of examples is processed in order to detect irregularities, the likelihood computed in accordance with the present invention may also reflect the frequency of appearance in the database. In this case, the examples in the database are required to reflect the actual frequencies. A simple change in the algorithm enables it to compute likelihood instead of MAP. By transforming the inference algorithm from a max-product to a sum-product the likelihood may be computed instead of the MAP assignment. The likelihood computation provided by the present invention may then be:

$$P(c_y, d_y^1, \ldots, l_y^1, \ldots) = \sum_X P(c_x, d_x^1, \ldots, l_x^1, \ldots, c_y, d_y^1, \ldots, l_y^1, \ldots) = $$
$$\alpha \sum_{c_x} P(c_y|c_x) P(c_x) \prod_i \sum_{l_x^i} P(l_y^i|l_x^i, c_x, c_y) \sum_{d_x^i} P(d_y^i|d_x^i) P(d_x^i|l_x^i)$$

This expression may be phrased as a message passing algorithm as shown in diagram 70 in FIG. 7. First, the message $m_{d_x^i}$ passed from node $d_x^i$ to node $l_x^i$ regarding its belief in the location $$l_x^i: \quad m_{dl}^i(l_x^i) = \sum_{d_x^i} P(d_y^i|d_x^i) P(d_x^i|l_x^i)$$

is computed for each patch. Namely, for each observed patch, all the candidate database locations $l_x^i$ with high descriptor similarity are computed and the appropriate likelihood is added to these database locations ($l_x^i$).

Next, for each of these candidate database locations, a message is passed about the induced likelihood of possible origin locations $c_x$ in the database:

$$m_{lc}^i(c_x) = \sum_{l_x^i} P(l_y^i|l_x^i, c_x, c_y) m_{dl}(l_x^i).$$

It will be appreciated that because $P(l_y^i|l_x^i,c_x,c_y)=P(l_y^i|l_x^i-c_x,0,c_y)$, $m_{lc}^i(c_x)$ may be efficiently computed using a convolution. At this point, there is a candidate list of origins suggested by each individual patch. To compute the likelihood of an entire ensemble, the beliefs from all the individual patches in the ensemble are multiplied:

$$m_c(c_x) = \prod_i m_{lc}^i(c_x)$$

Instead of directly implementing the inference algorithm above, progressive elimination as described with respect to FIGS. 8, 9A and 9B may be used, with summation replacing maximization. Multi-scale search may be performed as described hereinabove.

It will further be appreciated that the algorithm provided by the present invention and described with respect to FIG. 7 can compose an observation from a matching region in the database regardless of its absolute location in the database. This form of shift invariance might not be desired for some applications. For instance, a 3D volume of a brain may be inspected for anomalous tissue. The brain exhibits similar structure with slight variations in space. These slight variations are crucial for the brain function. In this case, it would not be desirable to compose an observation region (region in the inspected volume) with an example region taken from a completely different location on the brain, because differentiating these slight variations is important for detecting anomalous regions. In this case it would be desirable to restrict the algorithm to perform composition only using regions with near locations in the database.

Generally other restrictions on the ensemble search space (e.g., in space-time) may be defined. Formally, this may be done by removing the independency assumption $P(c_y,c_x)=P(c_y)P(c_x)$. Assuming that the database images are roughly registered, this can be done in practice by restricting the database search to approximately the same location as the observed ensemble in the query.

Applicants have further realized that in some applications, it may be desirable to be able to compose a region using the database, up to a global geometric transformation of the ensemble. For instance, scale or rotation invariance may be desired. Similarly, it may be desirable to allow deformations with a certain cost. For instance, it may be desirable to allow for small rotations between query and database, such that the bigger the rotation, the greater the penalty on the likelihood score. Transformation invariance may be seen as a uniform cost across all transformations.

In the algorithm described hereinabove with respect to FIG. 7, two types of deformations were defined: descriptor vector deformation and patch location deformation. The patch location deformation may be assumed to be a full-pixel displacement. However, other types of local deformations (e.g., rotation, scale) may be needed. In accordance with an additional preferred embodiment of the present invention, the framework of the present invention may be adapted to general global and local deformations.

First the probabilistic model may be formulated slightly differently to accommodate general global transformations. Instead of using $c_x$ and $c_y$, the parametric coordinate transformation between the hidden ensemble and the observed ensemble may be denoted $t_x$. It will be appreciated that in the previous formulation of the model $t_x$ is a parametric displacement transformation. The joint likelihood may then be factored as:

$$P(t_x, d_x^1, \ldots, l_x^1, \ldots, d_y^1, \ldots, l_y^1, \ldots) =$$
$$\alpha P(t_x) \prod_i P(l_y^i|l_x^i, t_x) P(d_y^i|d_x^i, t_x) P(d_x^i|l_x^i)$$

It will be appreciated that in some cases the descriptor is invariant to the global deformation (e.g., a patch descriptor is usually invariant to full-pixel translation, while SIFT is invariant to rotation). In these cases $P(d_y^i|d_x^i,t_x)=P(d_y^i|d_x^i)$ as in the original framework.

Then, the corresponding message passing algorithm may be defined as follows: First, the message $m_{dlt}^i$ passed from node $d_x^i$ to node $l_x^i$ and $t_x$ regarding its belief in the location $l_x^i$ and the global transformation $t_x$: $m_{dlt}^i(l_x^i,t_x)=\max P(d_y^i|d_x^i,t_x)P(d_x^i|l_x^i)$ is computed for each patch. Namely, for each observed patch, all the candidate database locations $l_x^i$ and global transformations $t_x$ with high descriptor similarity may be computed and the appropriate likelihood may be added to these entries $(l_x^i,t_x)$. If the descriptor is invariant to the global transformation, $$m_{dl}^i(l_x^i) = \max_{d_x^i} P(d_y^i|d_x^i)P(d_x^i|l_x^i)$$

may be computed instead. That is, the descriptor nodes do not carry a direct message to the global transformation node $t_x$.

Next for each of these candidate database locations, a message about the induced likelihood of the global transformation $$t_x: m_{lc}^i(t_x) = \max_{l_x^i} P(l_y^i|l_x^i, t_x) m_{dlt}(l_x^i, t_x)$$

may be passed. It will be appreciated that usually $P(l_y^i|l_x^i,t_x)=P(l_y^i|t_x(l_x^i))$. To compute the likelihood of an entire ensemble, the beliefs from all the individual patches in the ensemble and the prior transformation probability $$m_t(t_x) = P(t_x) \prod_i m_{lc}^i(t_x)$$

may be multiplied.

It will further be appreciated that in the composition algorithm provided by the present invention as described with respect to FIG. 7, the observation is scanned, and observed ensembles which are composed independently of each other are generated. Applicants have realized that this may usually be wasteful, as neighboring observed ensembles tend to have neighboring hidden ensembles in the database. Applicants have realized that this fact may be utilized to speed up the composition process by predicting the values of hidden ensemble variables. By using all the previously composed ensembles in the vicinity of the current ensemble, the location of the hidden ensemble and the identity of the hidden patches in the database may be predicted.

Applicants have realized that this prediction may significantly reduce the search space and thus the cost of composing the current ensemble. In cases where the prediction is bad and a low quality composition results (i.e., low likelihood of the observed region), the search of the current ensemble may proceed to the entire database. Thus, the predictive search may not prevent detection elsewhere in the database. However, Applicants have realized that in most cases the predictive search is quite accurate and that the inference time may be considerably reduced by employing it.

Applicants have further realized that when all of the visual examples (images or video) are stored in the database, there is overwhelming redundancy, as similar structures are stored over and over again. For instance, in the example described with respect to FIG. 2, similar body parts in the different database images are repeatedly stored. This problem is further amplified in video data where the amount of information is significantly increased and so is the redundancy (e.g., walking is defined by a single cycle, yet multiple walking cycles may be stored, possibly for multiple people). This redundancy poses a strict limitation on the database size and therefore on its generalization capabilities.

Applicants have realized that to address these limitations, the database may be incrementally constructed by saving only new pieces of visual information that do not already exist in the database. Previous visual examples in the database may be reused to code newer visual examples. In order to determine which parts of a new example to save, the composition algorithm may be used in order to compose the new example. Those parts that can be composed using previously stored examples need not be stored themselves. Instead, only the associations to the previously stored examples composing these parts may be stored, reducing storage requirements considerably. New parts which cannot be composed using previously stored examples may be added to the database.

It will be appreciated that a simple implementation of the database provided in the present invention would be to use an array of patch descriptors and search it linearly. However, Applicants have realized that time and space complexity may be improved significantly for database retrieval and storage respectively. In accordance with an additional preferred embodiment of the present invention, storage space may be reduced significantly by keeping approximations of the descriptor vectors.

For example, all of the descriptor vectors may be quantized or may be projected on a low dimensional linear space using techniques such as principal component analysis (PCA) and independent component analysis (ICA). Descriptors which are based on the intensity or color information may also be approximated as in Jojic et al ("Epitomic analysis of appearance and shape", 2003). In addition, vector quantization techniques (such as Kmeans, or as taught by Jurie et al. "Creating efficient codebooks for visual recognition", ICCV05, 2005) may be used to cluster groups of descriptors.

Applicants have realized that projection and quantization of descriptors may result in fewer descriptor types requiring storage, and a reduction in the length of each descriptor vector. Applicants have further realized that an additional benefit may be a reduction in the database retrieval time. It will be appreciated that projection and quantization introduces errors in the descriptor vectors. Applicants have realized that these errors may be eliminated if each 'compressed' descriptor contains a link to the original descriptor. In this embodiment, storage space would not be reduced, but the retrieval time would be reduced. Applicants have further realized that a related approach which may be employed in order to reduce database retrieval time is to use better data structures for storing the descriptor vectors, such as KD-trees and hash-tables for finding approximate nearest neighbors.

Applications of the inference-by-composition approach provided by the present invention were described previously with respect to FIGS. 10, 11, 12 and 13. Applicants have realized that the inference-by-composition approach provided by the present invention may be useful in additional applications, such as automatic visual inspection (Quality Assurance), detecting abnormalities in medical images/signals and other signals, and video summarization and synopsis.

Automatic visual inspection is widely used for quality assurance in the manufacture of goods, electronic printed boards, wafers, etc. One of the main problems in automatic inspection is describing all the possible correct patterns. In some simple cases, an exact reference for comparison can be supplied. In those cases automatic inspection becomes a simple problem of pattern matching with change detection. However, there are many important complex cases where it is meaningless or impossible to provide a reference for comparison (e.g., because of the combinatorial complexity of the space of "good" cases).

Applicants have realized that such cases may be addressed by the approach provided in the present invention for detecting irregularities. Given only a few examples of expected/normal patterns (for goods, printed boards, wafers, photomasks, flat panel displays, ceramic tiles, fabric, fruits, etc.) the present invention, as described hereinabove, may enable generalizations to be drawn from the few examples provided and new observations that were never seen before to be composed. In accordance with this additional preferred embodiment of the present invention, defects in goods may be identified where regions with low composition likelihood are detected by irregularity detector 30.

Figure 14:
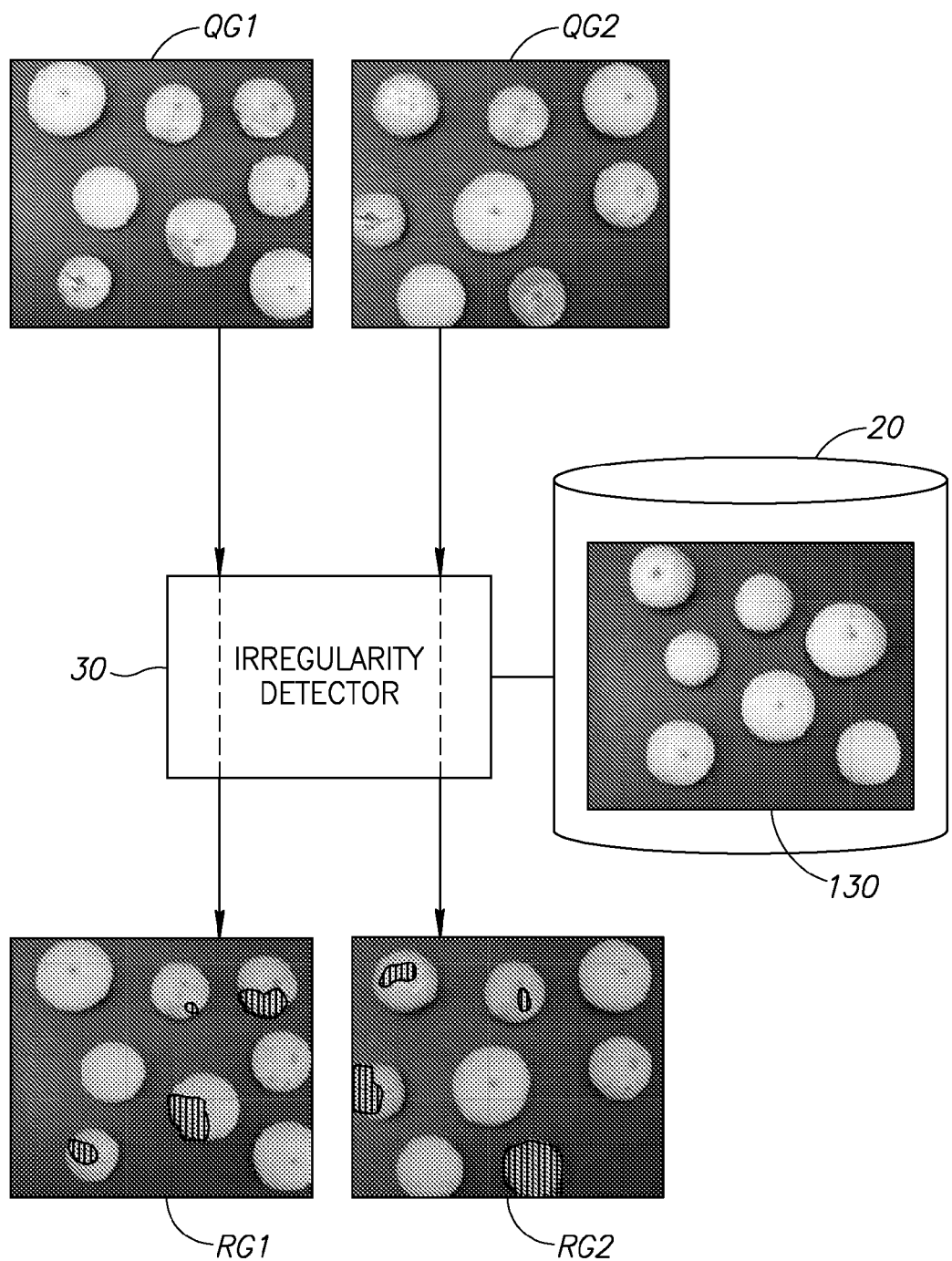
FIG. 14 is an illustration of an additional embodiment of the present invention employed to detect defects in goods using the implementation of the present invention illustrated in FIG. 10.

In FIG. 14, reference to which is now made, the detection of defects by the present invention in the inspection of grapefruits is illustrated. As shown in FIG. 14, database 20 contains an image of good quality grapefruits, against which, in accordance with the present invention, irregularity detector 30 may compare query images QG1 and QG2 of grapefruits requiring inspection. As shown in result images RG1 and RG2, irregularity detector 30 detects the portions of the grapefruits shown in query images QG1 and QG2 (respectively) which do not meet the standards of quality exemplified by the grapefruit images in database image 130. The sub-standard portions of the grapefruits, which are irregular with respect to database image 130, are marked in result images RG1 and RG2 with the vertical hatching pattern indicating irregularity. Applicants have realized that in some cases it may be useful to add also defect ("negative") examples to generalize from.

Figure 15A:
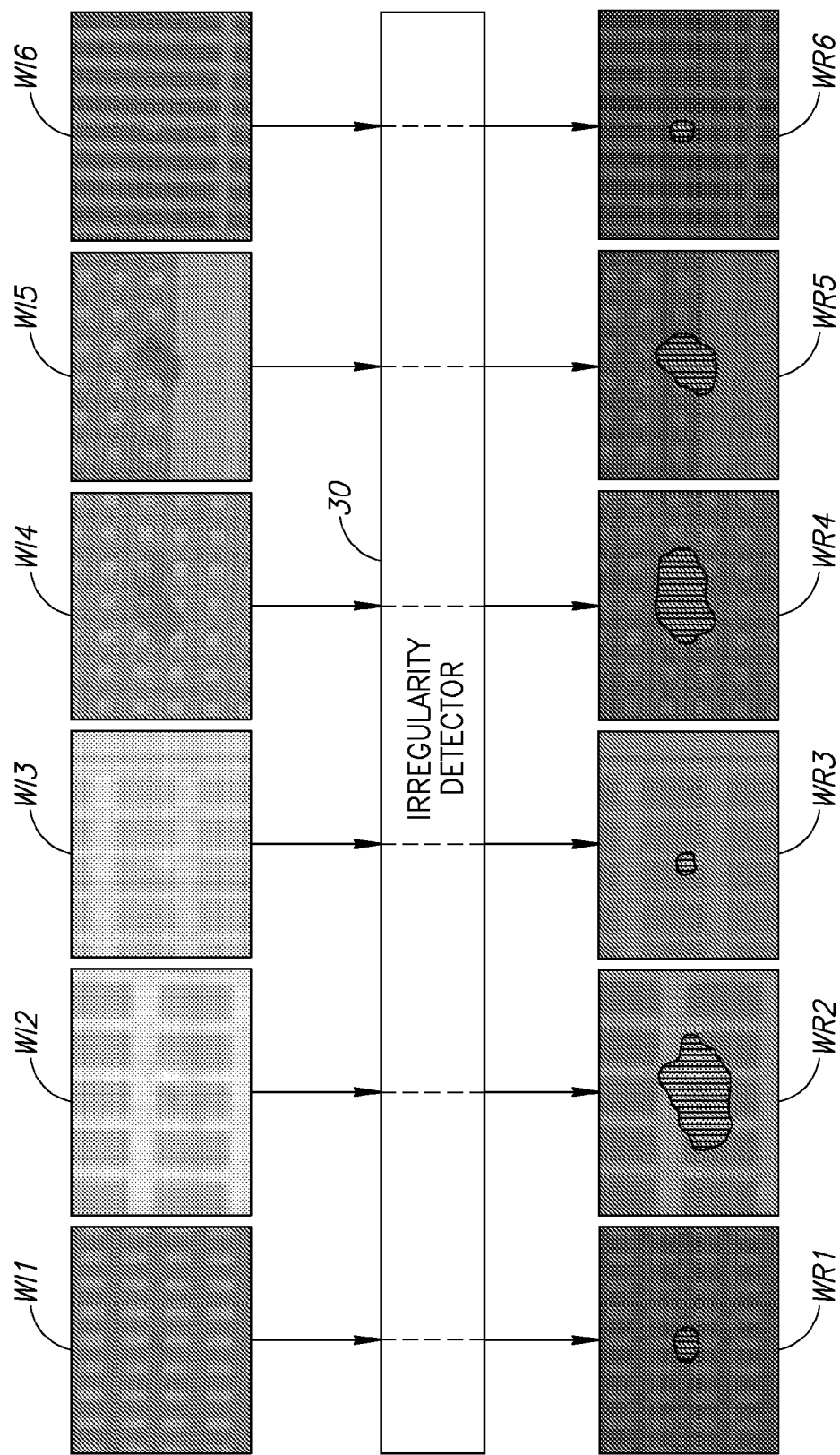
FIG. 15A is an illustration of an additional embodiment of the present invention employed to detect defects in goods using the implementation of the present invention illustrated in FIG. 11.
Figure 15B:
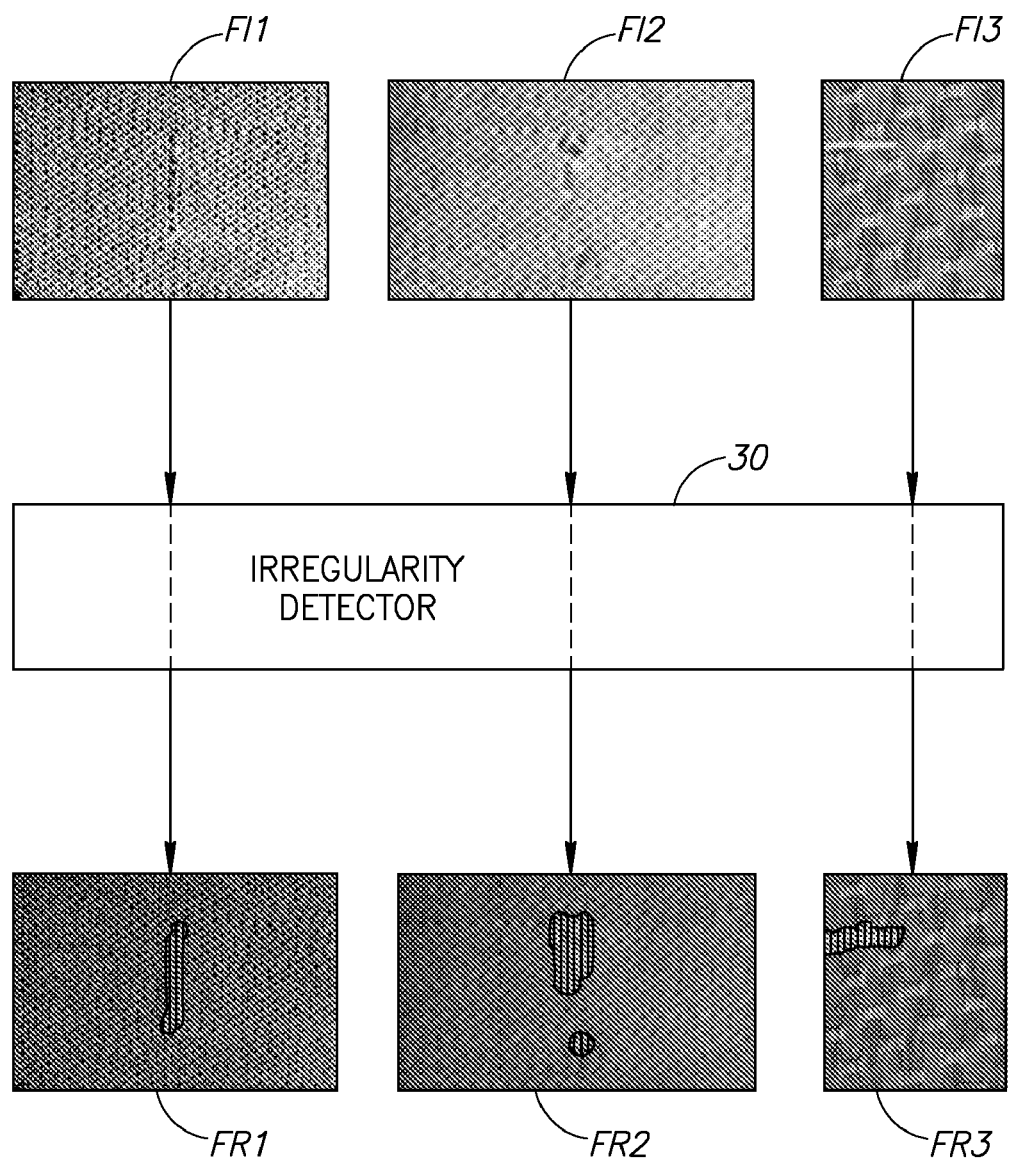
FIG. 15B is an illustration of the embodiment of FIG. 15A for an alternative type of goods.

Applicants have realized that inspected products often exhibit repeating patterns (e.g., wafers, fabric, flat panel displays). In these cases, the saliency approach provided by the present invention, described hereinabove with respect to FIG. 11, may be used to detect defects without any prior examples. FIGS. 15A and 15B, reference to which is now made, illustrate exemplary inspections by the present invention of wafers and fabric respectively.

In the example shown in FIG. 15A, irregularity detector 30 searches for irregularities in wafer images WI1, WI2, WI3, WI4, WI5 and WI6 in accordance with the present invention. In result images WR1, WR2, WR3, WR4, WR5 and WR6, the salient areas of wafer images WI1, WI2, WI3, WI4, WI5 and WI6 (respectively), i.e. the defective, irregular areas, are indicated by vertical hatching.

Similarly, in FIG. 15B, exemplary inspections of exemplary fabric images FI1, FI2 and FI3 by irregularity detector

30 are shown. In result images FR1, FR2 and FR3, the salient areas of exemplary fabric images FI1, FI2 and FI3 (respectively), which are detected by irregularity detector 30 as the defective areas of the fabric samples, are indicated by vertical hatching.

It will be appreciated that for the examples of defect detection shown in FIGS. 14, 15A and 15B, patch descriptors based on RGB or gray levels values were used. Furthermore, a Gaussian distribution for modeling descriptor similarity (i.e. dis=SSD) was used. However, it will be appreciated that the present invention is not limited to these particular patch descriptors or to this particular distribution for modeling descriptor similarity, and that any other suitable patch descriptors and distributions for modeling descriptor similarity are included in the disclosure of the present invention.

In an additional preferred embodiment of the present invention, suspicious objects in security examination of luggage (e.g., X-ray images of luggage in airports or in other public places) may be detected.

Applicants have realized that the approach provided in the present invention may also be adapted to 3D visual inspection. Applicants have realized that aside from choosing an appropriate 3D patch descriptor (e.g. intensity values), the algorithm for 3D visual inspection may be identical to the algorithm for detecting suspicious behaviors in space-time, where the time coordinate is replaced by a Z (depth) coordinate. It will be appreciated that 3D visual inspection may be used for inspecting various industrial/medical parts (e.g., parts in the automobile industry, packages, etc.)

Applicants have realized that the present invention may also be used for detecting abnormalities in medical images/signals (medical imaging) and other signals. For example, tumors or other types of irregular tissue may be automatically located using image examples from healthy (and/or non-healthy) patients. This embodiment of the present invention may utilize the property of symmetry for generating a database (e.g., the left hemisphere of the brain reflected as a database for inspecting the right hemisphere of the brain). For dynamic data (e.g., functional MRI) the space-time framework may be used in order to detect abnormalities (spatial and/or temporal).

Applicants have further realized that it may also be straightforward to extend the approach provided in the present invention to detect abnormalities in medical 3D volumetric information, with the selection of appropriate descriptors and the replacement of a time axis with a depth axis.

Applicants have further realized that the framework provided in the present invention may also be used for other types of non-visual signals such as E.K.G., E.C.G., acoustic signals (e.g. sonar, ultrasound), radar, voice, seismic recordings, and other electrical signals. In cases where the signal does not have a spatial context (e.g., E.K.G), patches may have only a temporal coordinate, but the rest of the framework may remain the same. For example, the saliency framework provided by the present invention may be used for detecting locations of abnormal E.K.G patterns relative to patterns in a preceding window of time. Similarly, locations in an audio signal where a voice was raised in a conversation may be detected. In this case, a descriptor which is based on the average signal amplitude in a small time segment may be used. However, it will be appreciated that other descriptors may also be used.

It will be appreciated that in the foregoing description of behavioral saliency with respect to FIG. 13, the search objective was saliency relative to a current window in time, such that behaviors which were salient at a given moment were detected. In an additional preferred embodiment of the present invention, behavioral saliency may be measured relative to other temporal windows. For example, when saliency is measured with respect to an entire video sequence, behaviors which occur only once in the entire sequence may be detected. Alternatively, when saliency is measured relative to the past (i.e., all previous frames), new behaviors which have not previously occurred will be detected.

The present invention may thus be useful in a variety of additional applications, including video synopsis, video summarization and intelligent fast forward. Intelligent fast forward may be implemented for fast-forwarding to the next salient action or behavior. For example, the approach provided in the present invention may be used for summarizing a gymnastic exercise by detecting all the locations in the video sequence when a new action occurred. Then, short sequences showing the action (e.g., running, jumping, flip-flop) or images extracted from these locations may be used to create a storyboard. This technique may also be used for implementing intelligent fast-forward for bypassing a monotone action. For instance, when monitoring a monotone action (e.g., a janitor cleaning the floor), an intelligent fast forward may be performed in order to fast forward to the next spot in the video when something new happens.

It will be appreciated that the present invention may be operational in a variety of embodiments on a variety of signals or groups of signals. For example, the types of signals which may be processed in accordance with various embodiments of the present invention may be visual signals, images, video sequences, acoustic signals, electrical signals, radar signals, seismic signals, voice signals, sonar signals, thermal signals, medical signals, medical images, functional magnetic resonance imaging (FMRI) data, ultrasound signals, electrocardiogram signals, x-ray data, range data, multi-spectral data and N-dimensional signals where N is an integer.

It will further be appreciated that a query processed in the present invention may comprise data of one signal type, or of more than one signal type. Referential data in the present invention may also be comprised of one signal type, or of more than one signal type.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method executable on a computing device for identifying contextual irregularities in new query data, the method comprising:
    composing an approximate copy of new query data from at least chunks of referential data wherein each individual said chunk is locally similar to an individual region in said new query data;
    associating irregularity scores to individual data points within said new query data wherein an irregularity score at a data point is based at least on a size of a chunk matching a region surrounding said individual data point, wherein a small chunk infers high irregularity at said individual data point and a large chunk infers low irregularity at said individual data point; and
    inferring said contextual irregularities from said irregularity scores.

2. The method according to claim 1 and wherein said referential data is at least one signal and said new query data is at least one signal.

3. The method according to claim 2 wherein said referential data is at least of one type of signal and said new query data is at least of another type of signal.

4. The method according to claim 2 and wherein said at least one signal is at least one of the following types: a visual signal, an image and a video sequence.

5. The method according to claim 2 and wherein said at least one signal is at least one of the following types: an acoustic signal, an electrical signal, a radar signal, a seismic signal, a voice signal, a sonar signal, a thermal signal, a medical signal, a medical image, functional magnetic resonance imaging (FMRI) data, an ultrasound signal, an electrocardiogram signal, x-ray data, range data, multi-spectral data and an N-dimensional signal where N is an integer.

6. The method according to claim 1 and wherein said referential data is at least one image and said new query data is at least one image.

7. The method according to claim 1 and wherein said referential data is at least one video sequence and said new query data is at least one video sequence.

8. The method according to claim 1 and wherein said new query data is a section of a signal and said referential data is a different part of said signal.

9. The method according to claim 8 and wherein said inferring determines saliency of said new query data with respect to said different part.

10. The method according to claim 8 and wherein said composing is performed successively on each one of a series of sections of said signal.

11. The method according to claim 8 and wherein said signal is an image.

12. The method according to claim 8 and wherein said signal is video data.

13. The method according to claim 8 and wherein said at least one signal is at least one of the following types: a visual signal, an image and a video sequence.

14. The method according to claim 8 and wherein said at least one signal is at least one of the following types: an acoustic signal, an electrical signal, a radar signal, a seismic signal, a voice signal, a sonar signal, a thermal signal, a medical signal, a medical image, functional magnetic resonance imaging (FMRI) data, an ultrasound signal, an electrocardiogram signal, x-ray data, range data, multi-spectral data and an N-dimensional signal where N is an integer.

15. The method according to claim 1 and wherein said new query data is one signal of a collection of signals and said referential data is the rest of the collection of signals and wherein said inferring determines which signal of said collection of signals is different than the other signals in said collection.

16. The method according to claim 1 and wherein said irregularities are defects in goods.

17. The method according to claim 1 and wherein said irregularities are suspicious objects in security imaging.

18. The method according to claim 1 and wherein said irregularities are suspicious behaviors in video sequences.

19. The method according to claim 1 and wherein said irregularities are salient behaviors in video data.

20. The method according to claim 1 and wherein said irregularities are salient objects in image data.

21. The method according to claim 8 and wherein said signal is acquired over time and said different part is acquired previously in time relative to said region.

22. The method according to claim 21 and wherein said signal is a video sequence and said irregularities are salient behaviors with respect to prior behavior in said video sequence.

23. The method according to claim 19 and wherein said salient behaviors are with respect to current behavior in said video data.

24. The method according to claim 1 and wherein said inferring is employed for drawing attention to portions of said query data which stand out.

25. The method according to claim 1 and wherein said inferring is employed for automatic visual inspection.

26. The method according to claim 2 wherein said inferring is employed for at least one of the following: synopsis of a signal, signal summarization and fast forward to a next salient event in a signal.

27. The method according to claim 26 and wherein said signal is video data.

28. The method according to claim 1 and wherein said composing comprises:
considering at least one region around at least one data point in said new query data; and
for each said region, searching for a similar said chunk within said referential data
and wherein said associating comprises:
determining a regularity score for said data point as a function of at least a size of said at least one said chunk matched to said at least one region; and
determining an irregularity score from said regularity score.

29. The method according to claim 28 and wherein said searching comprises calculating a composition score for each said chunk as a function of at least one of a degree of similarity of said chunk to said region and a size and shape of said chunk, wherein said regularity score is a function of said composition score of said at least one chunk associated with said data point.

30. The method according to claim 29 and wherein said regularity score function is one of a maximum and a sum of said composition scores.

31. The method according to claim 28 and wherein said at least one region is a multiplicity of regions of at least one of different sizes and shapes.

32. The method according to claim 28 and wherein said region around said data point begins large and also comprising repeating said searching on a smaller region than said region if said searching does not yield at least one said similar chunk.

33. The method according to claim 28 and also comprising combining regions if their associated chunks bear a geometric relationship similar to that of said regions to be combined.

34. The method according to claim 28 and wherein said each said region comprises a query ensemble of patches, and wherein said similar said chunk comprises a referential ensemble of patches.

35. The method according to claim 34 wherein each said region is at least one of the following: a spatial region, a temporal region and a spatio-temporal region and wherein said patches are at least one of the following:
spatial patches, temporal patches and spatio-temporal patches.

36. The method according to claim 34 and wherein said patches are of different resolutions and wherein said searching is from coarse to fine.

37. The method according to claim 34 and wherein said searching comprises:
comparing properties of candidate referential ensembles of said referential data with properties of said query ensemble; and identifying at least one of said candidate referential ensembles as said similar chunk if results of said comparing fall within predefined criteria.

38. The method according to claim 37 and wherein said properties comprise at least one of the following parameters for component patches of said query ensemble and said candidate referential ensembles: absolute patch locations, relative patch locations and patch descriptors.

39. The method according to claim 38 wherein said patch descriptors are at least one of the following types: color, grey levels, normalized color, normalized grey levels, gradient information, normalized gradient information, flow fields, normal flows, motion information, motion parameters, time derivatives, normalized time derivatives, histogram information and moment information.

40. The method according to claim 37 and wherein comparing properties comprises computing at least one of the following types of said similarity scores: sum-of-differences, sum-of-squared differences, sum-of-absolute-differences, Lp-norms, where p is an integer, mutual information, correlation, normalized correlation, robust measures, histogram comparison measures and motion consistency measures.

41. The method according to claim 37 and wherein said criteria include margins for small local misalignments in the positions of corresponding patches in said query ensemble and said candidate referential ensembles.

42. The method according to claim 37 and wherein said criteria include margins for small geometric deformations of corresponding patches in said query ensemble and said candidate referential ensembles.

43. The method according to claim 37 and wherein said criteria include margins for small mismatches in said properties of corresponding patches.

44. The method according to claim 37 and wherein said searching comprises using geometric arrangements of said patches in said ensembles to narrow a search space by progressively eliminating candidate referential ensembles which do not contain a match to at least one patch in said query ensemble.

45. The method according to claim 28 and wherein said searching accommodates global geometric transformations of said region with respect to said chunk.

46. The method according to claim 1 and wherein said referential data includes at least negative examples.

47. The method according to claim 1 and wherein said referential data includes at least positive examples.

48. A contextual irregularity detection apparatus comprising:
a query composer to compose an approximate copy of new query data from chunks of referential data wherein each individual said chunk is locally similar to an individual region in said new query data; and
an irregularity detector to detect contextual irregularities in said new query data based on irregularity scores by associating said irregularity scores to individual data points within said new query data wherein an irregularity score at a data point is based at least on a size of a chunk matching a region surrounding said individual data point, wherein a small chunk infers high irregularity at said individual data point and a large chunk infers low irregularity at said individual data point.

49. The apparatus according to claim 48 and wherein said referential data is at least one signal and said new query data is at least one signal.

50. The apparatus according to claim 49 wherein said referential data is at least of one type of signal and said new query data is at least of another type of signal.

51. The apparatus according to claim 49 and wherein said at least one signal is at least one of the following types: a visual signal, an image and a video sequence.

52. The apparatus according to claim 49 and wherein said at least one signal is at least one of the following types: an acoustic signal, an electrical signal, a radar signal, a seismic signal, a voice signal, a sonar signal, a thermal signal, a medical signal, a medical image, functional magnetic resonance imaging (FMRI) data, an ultrasound signal, an electrocardiogram signal, x-ray data, range data, multi-spectral data and an N-dimensional signal where N is an integer.

53. The apparatus according to claim 48 and wherein said referential data is at least one image and said new query data is at least one image.

54. The apparatus according to claim 48 and wherein said referential data is at least one video sequence and said new query data is at least one video sequence.

55. The apparatus according to claim 48 and wherein said new query data is a section of a signal and said referential data is a different part of said signal.

56. The apparatus according to claim 55 and wherein said irregularity detector determines saliency of said new query data with respect to said different part.

57. The apparatus according to claim 55 and wherein said query composer comprises iteration means to operate successively on each one of a series of sections of said signal.

58. The apparatus according to claim 55 and wherein said signal is an image.

59. The apparatus according to claim 55 and wherein said signal is video data.

60. The apparatus according to claim 55 and wherein said at least one signal is at least one of the following types: a visual signal, an image and a video sequence.

61. The apparatus according to claim 55 and wherein said at least one signal is at least one of the following types: an acoustic signal, an electrical signal, a radar signal, a seismic signal, a voice signal, a sonar signal, a thermal signal, a medical signal, a medical image, functional magnetic resonance imaging (FMRI) data, an ultrasound signal, an electrocardiogram signal, x-ray data, range data, multi-spectral data and an N-dimensional signal where N is an integer.

62. The apparatus according to claim 48 and wherein said new query data is one signal of a collection of signals and said referential data is the rest of the collection of signals and wherein said irregularity detector comprises means for determining which signal of said collection of signals is different than the other signals in said collection.

63. The apparatus according to claim 48 and wherein said irregularities are defects in goods.

64. The apparatus according to claim 48 and wherein said irregularities are suspicious objects in security imaging.

65. The apparatus according to claim 48 and wherein said irregularities are suspicious behaviors in video sequences.

66. The apparatus according to claim 48 and wherein said irregularities are salient behaviors in video data.

67. The apparatus according to claim 48 and wherein said irregularities are salient objects in image data.

68. The apparatus according to claim 55 and wherein said signal is acquired over time and said different part is acquired previously in time relative to said region.

69. The apparatus according to claim 68 and wherein said signal is a video sequence and said irregularities are salient behaviors with respect to prior behavior in said video sequence.

70. The apparatus according to claim 66 and wherein said salient behaviors are with respect to current behavior in said video data.

71. The apparatus according to claim 48 which is employed for drawing attention to portions of said query data which stand out.

72. The apparatus according to claim 48 which is employed for automatic visual inspection.

73. The apparatus according to claim 49 which is employed for at least one of the following: synopsis of a signal, signal summarization and fast forward to a next salient event in a signal.

74. The apparatus according to claim 73 and wherein said signal is video data.

75. The apparatus according to claim 48 and wherein said query composer comprises:
a searcher to search, for at least one region around at least one data point in said new query data, for a similar said chunk within said referential data
and wherein said irregularity detector comprises:
a regularity score determiner to determine a regularity score for said data point as a function of at least of a size of at least one said chunk matched to said at least one region; and
an irregularity identifier to determine an irregularity score from said regularity score.

76. The apparatus according to claim 75 and wherein said searcher comprises a composition score determiner to calculate a composition score for each said chunk as a function of at least one of a degree of similarity of said chunk to said region a size and shape of said chunk, wherein said regularity score is a function of said composition score of said at least one chunk associated with said data point.

77. The apparatus according to claim 76 and wherein said regularity score function is one of a maximum and a sum of said composition scores.

78. The apparatus according to claim 75 and wherein said at least one region is a multiplicity of regions of at least one of different sizes and shapes.

79. The apparatus according to claim 75 and wherein said region around said data point begins large and also comprising means for operating said searcher on a smaller region than said region if said searcher does not yield at least one said similar chunk.

80. The apparatus according to claim 75 and also comprising a region combiner to combine regions if their associated chunks bear a geometric relationship similar to that of said regions to be combined.

81. The apparatus according to claim 75 and wherein each said region comprises a query ensemble of patches, and wherein said similar said chunk comprises a referential ensemble of patches.

82. The apparatus according to claim 81 wherein each said region is at least one of the following: a spatial region, a temporal region and a spatio-temporal region and wherein said patches are at least one of the following: spatial patches, temporal patches and spatio-temporal patches.

83. The apparatus according to claim 81 and wherein said patches are of different resolutions and wherein said searcher comprises means for searching from coarse to fine.

84. The apparatus according to claim 81 and wherein said searcher comprises:
a comparator to compare properties of candidate referential ensembles of said referential data with properties of said query ensemble; and
and a candidate identifier to identify at least one of said candidate referential ensembles as said similar chunk if the output of said comparator falls within predefined criteria.

85. The apparatus according to claim 84 and wherein said properties comprise at least one of the following parameters for component patches of said query ensemble and said candidate referential ensembles: absolute patch locations, relative patch locations and patch descriptors.

86. The apparatus according to claim 85 wherein said patch descriptors are at least one of the following types: color, grey levels, normalized color, normalized grey levels, gradient information, normalized gradient information, flow fields, normal flows, motion information, motion parameters, time derivatives, normalized time derivatives, histogram information and moment information.

87. The apparatus according to claim 84 and wherein comparator comprises a similarity score calculator to compute at least one of the following types of said similarity scores: sum-of-differences, sum-of-squared differences, sum-of-absolute-differences, Lp-norms, where p is an integer, mutual information, correlation, normalized correlation, robust measures, histogram comparison measures and motion consistency measures.

88. The apparatus according to claim 84 and wherein said criteria include margins for small local misalignments in the positions of corresponding patches in said query ensemble and said candidate referential ensembles.

89. The apparatus according to claim 84 and wherein said criteria include margins for small geometric deformations of corresponding patches in said query ensemble and said candidate referential ensembles.

90. The apparatus according to claim 84 and wherein said criteria include margins for small mismatches in said properties of corresponding patches.

91. The apparatus according to claim 84 and wherein said searcher comprises means to utilize geometric arrangements of said patches in said ensembles to narrow a search space by progressively eliminating candidate referential ensembles which do not contain a match to at least one patch in said query ensemble.

92. The apparatus according to claim 75 and wherein said searcher comprises means to accommodate global geometric transformations of said region with respect to said chunk.

93. The apparatus according to claim 48 and wherein said referential data includes at least negative examples.

94. The apparatus according to claim 48 and wherein said referential data includes at least positive examples.

95. The method according to claim 1 and wherein said method is implemented in the context of at least one of: automatic visual inspection, quality assurance, security, surveillance, monitoring, attention mechanism, detecting abnormalities in signals, video summarization, video synopsis, and fast-forward.

96. The apparatus according to claim 75 and wherein said apparatus is configured as part of a system for at least one of: automatic visual inspection, quality assurance, security, surveillance, monitoring, attention mechanism, detecting abnormalities in signals, video summarization, video synopsis, and fast-forward.

* * * * *